(12) United States Patent
Hobbs

(10) Patent No.: US 12,661,563 B1
(45) Date of Patent: Jun. 23, 2026

(54) ADDITIVE MANUFACTURING FOR GOLF CLUB SHAFT

(71) Applicant: Cobra Golf Incorporated, Carlsbad, CA (US)

(72) Inventor: Bryce W. Hobbs, Escondido, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 8 days.

(21) Appl. No.: 18/140,109

(22) Filed: Apr. 27, 2023

Related U.S. Application Data

(63) Continuation of application No. 17/719,013, filed on Apr. 12, 2022, now Pat. No. 12,246,228, which is a continuation of application No. 16/815,303, filed on Mar. 11, 2020, now Pat. No. 11,298,600.

(60) Provisional application No. 62/821,549, filed on Mar. 21, 2019.

(51) Int. Cl.
*A63B 53/10* (2015.01)
*B33Y 80/00* (2015.01)

(52) U.S. Cl.
CPC .......... *A63B 53/10* (2013.01); *A63B 2209/02* (2013.01); *B33Y 80/00* (2014.12)

(58) Field of Classification Search
CPC ..... A63B 53/10; A63B 53/12; A63B 2209/02; B33Y 80/00
USPC .................................................. 473/316–323
See application file for complete search history.

(56) References Cited

U.S. PATENT DOCUMENTS

| | | | | |
|---|---|---|---|---|
| 3,972,529 A | * | 8/1976 | McNeil | A63B 53/12 |
| | | | | 428/35.8 |
| 4,836,545 A | * | 6/1989 | Pompa | A63B 53/10 |
| | | | | 273/DIG. 7 |
| 5,028,464 A | * | 7/1991 | Shigetoh | A63B 53/10 |
| | | | | 428/36.1 |
| 5,253,867 A | * | 10/1993 | Gafner | A63B 53/10 |
| | | | | 473/320 |
| 5,259,614 A | * | 11/1993 | Greer | A63B 60/00 |
| | | | | 273/DIG. 7 |
| 5,265,872 A | | 11/1993 | Tennent | |
| 5,294,119 A | * | 3/1994 | Vincent | A63B 60/54 |
| | | | | 273/DIG. 23 |
| 5,607,364 A | * | 3/1997 | Hedrick | A63B 60/54 |
| | | | | 473/318 |
| 5,743,811 A | | 4/1998 | Bird | |
| 5,788,585 A | * | 8/1998 | Jackson | A63B 53/10 |
| | | | | 473/319 |
| 5,810,676 A | * | 9/1998 | Bird | A63B 53/10 |
| | | | | 273/DIG. 7 |
| 5,902,656 A | * | 5/1999 | Hwang | F16F 9/306 |
| | | | | 138/146 |
| 5,913,734 A | * | 6/1999 | Tanaka | A63B 53/12 |
| | | | | 473/320 |
| 6,132,323 A | * | 10/2000 | Smith | A63B 60/54 |
| | | | | 273/DIG. 7 |
| 6,231,456 B1 | * | 5/2001 | Rennie | A63B 60/00 |
| | | | | 473/316 |
| 6,306,474 B1 | * | 10/2001 | Yoshioka | B29C 70/88 |
| | | | | 428/299.7 |

(Continued)

*Primary Examiner* — Sebastiano Passaniti
(74) *Attorney, Agent, or Firm* — Quarles & Brady LLP

(57) ABSTRACT

A golf club shaft includes an extended body that includes an outer layer and extends between a butt end and a tip end. The extended body includes at least two unlike materials printed together, and the extended body is unitary.

18 Claims, 18 Drawing Sheets

(56)         References Cited

U.S. PATENT DOCUMENTS

| | | | | |
|---|---|---|---|---|
| 6,602,148 B2 * | 8/2003 | Hsu | A63B 53/10 | |
| | | | 473/319 | |
| 6,820,654 B2 * | 11/2004 | Lindsay | F16L 9/147 | |
| | | | 138/153 | |
| 6,863,623 B2 | 3/2005 | Oyama | | |
| 6,890,269 B2 | 5/2005 | Burrows | | |
| 7,140,973 B2 | 11/2006 | Rohrer | | |
| 7,494,423 B2 | 2/2009 | Cheng | | |
| 8,056,450 B2 | 11/2011 | Hsieh | | |
| 9,330,406 B2 | 5/2016 | Soracco | | |
| 9,452,323 B2 | 9/2016 | Kronenberg | | |
| 10,046,215 B2 | 8/2018 | Eastman | | |
| 10,384,107 B2 | 8/2019 | Knight | | |
| 10,525,315 B1 | 1/2020 | Wells | | |
| 11,015,482 B2 | 5/2021 | Kasal | | |
| 2002/0072432 A1 | 6/2002 | Hirata | | |
| 2002/0094881 A1 * | 7/2002 | Ashida | A63B 53/10 | |
| | | | 473/319 | |
| 2003/0171159 A1 * | 9/2003 | Unosawa | A63B 53/10 | |
| | | | 473/319 | |
| 2003/0235671 A1 * | 12/2003 | Sano | A63B 49/10 | |
| | | | 428/36.91 | |
| 2004/0092330 A1 * | 5/2004 | Meyer | A63B 60/00 | |
| | | | 473/318 | |
| 2005/0079926 A1 | 4/2005 | Oldenburg | | |
| 2005/0107182 A1 * | 5/2005 | Meyer | A63B 53/10 | |
| | | | 473/318 | |
| 2006/0046867 A1 * | 3/2006 | Murphy | A63B 60/00 | |
| | | | 473/316 | |
| 2006/0128494 A1 | 6/2006 | Kumamoto | | |
| 2006/0258478 A1 * | 11/2006 | Hsu | A01K 87/00 | |
| | | | 473/316 | |
| 2007/0026960 A1 | 2/2007 | Butler | | |
| 2007/0207186 A1 * | 9/2007 | Scanlon | A61F 2/91 | |
| | | | 623/1.42 | |
| 2010/0065717 A1 | 3/2010 | Wilson | | |
| 2011/0281082 A1 | 11/2011 | Wilson | | |
| 2012/0190473 A1 * | 7/2012 | Swist | A63C 5/07 | |
| | | | 473/282 | |
| 2016/0125494 A1 | 5/2016 | Soracco | | |
| 2018/0200591 A1 | 7/2018 | Davis | | |
| 2018/0229092 A1 * | 8/2018 | Tyler | F41C 23/18 | |
| 2021/0222588 A1 | 7/2021 | Kasal | | |

* cited by examiner

221

225

229

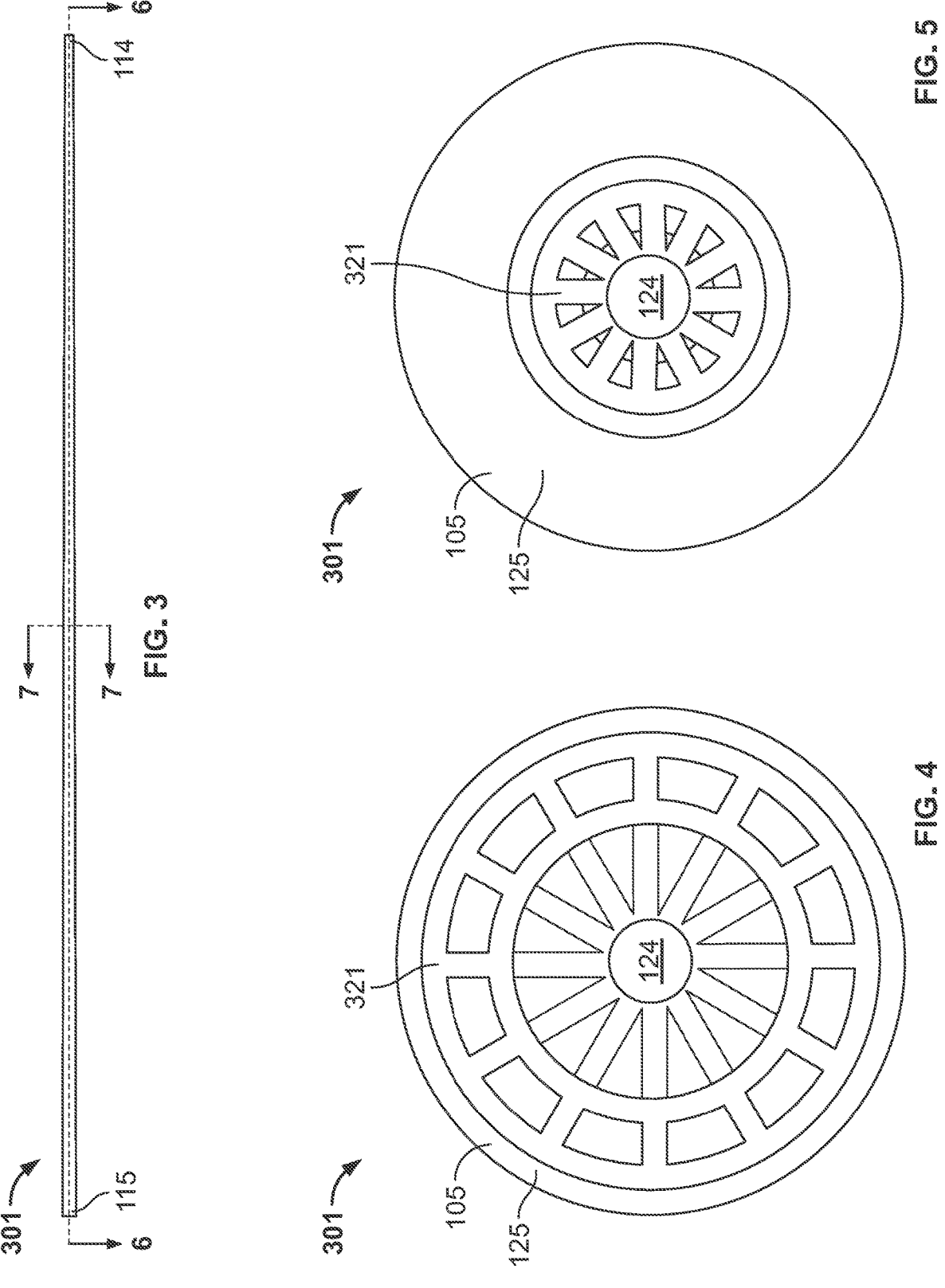

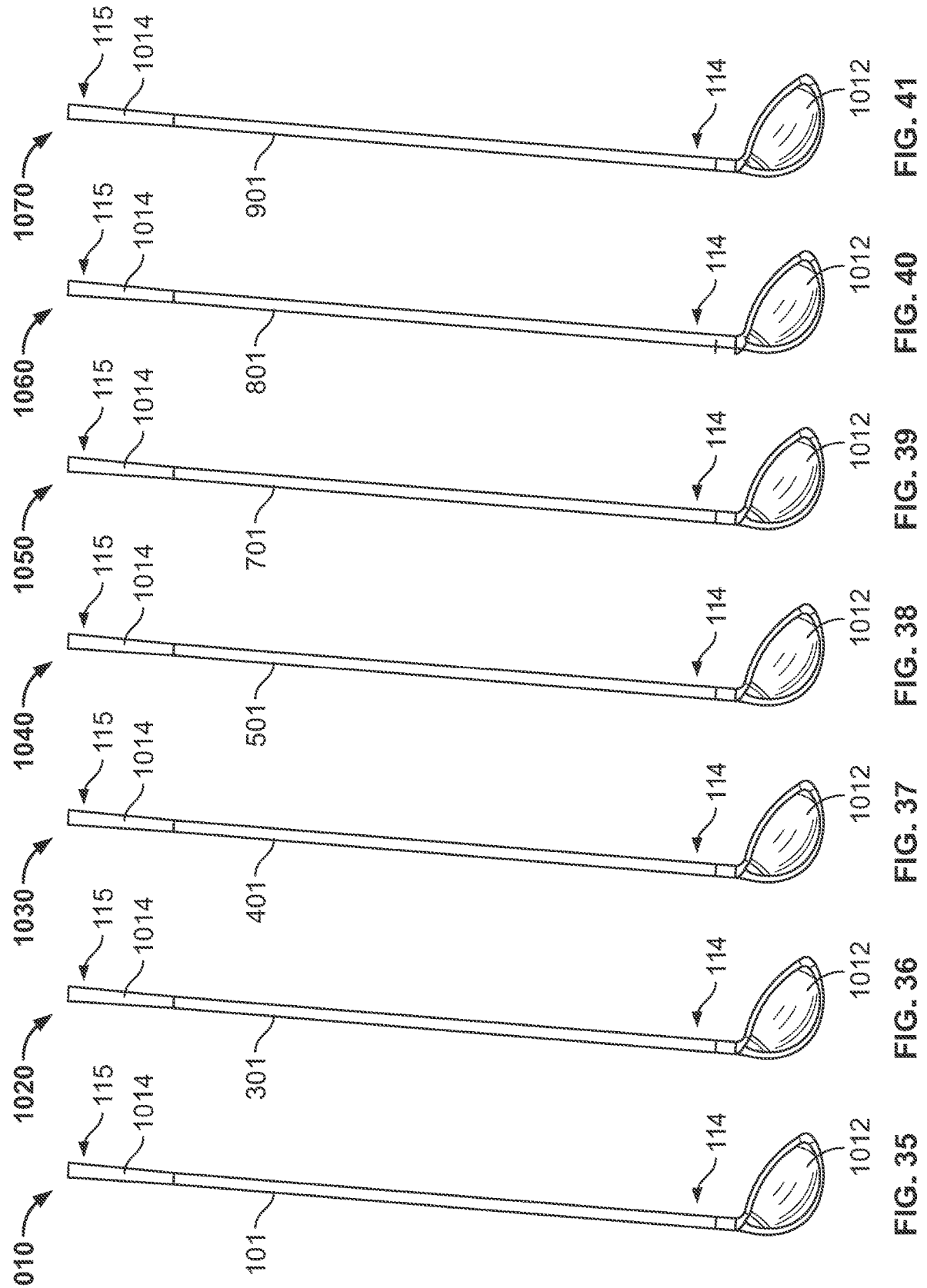

ADDITIVE MANUFACTURING FOR GOLF CLUB SHAFT

RELATED APPLICATIONS

The present application is a non-provisional application and claims priority to U.S. application Ser. No. 17/719,013, filed on Apr. 12, 2022, which is a continuation of U.S. application Ser. No. 16/815,303, filed on Mar. 11, 2020, which issued as U.S. Pat. No. 11,298,600 and claims priority to U.S. Provisional Application Ser. No. 62/821,549 filed on Mar. 21, 2019, each being incorporated by reference in its entirety herein.

TECHNICAL FIELD

The invention relates to golf clubs.

BACKGROUND

Golfers spend a lot of time and money to obtain golf clubs with the best technology to help them make shots that are long and accurate. Golfers will spend hours in the pro shop and significant amounts of money to pick the driver head that adds a few yards to their drive, or for specialty forged irons that will give them even a small score improvement. Interestingly, almost all golf clubs have one trait in common in that they only have one significantly moving part, the golf club shaft. Save for some subtle deflections in a club head's ball-striking face, the only part of a golf club that really moves, bends, and deforms during regular play is the shaft.

Shafts for golf clubs may be made out of steel or graphite. Steel shafts are rolled and cut from a thin plate, then welded. Graphite/carbon shafts are rolled, then cured. Shafts made by those methods have limits to their strength and existing manufacturing techniques do not give designers many options for fine control over shaft flexibility, or the range of movements that a shaft will exhibit during regular play. In fact, given that the shaft is the moving part of a golf club that moves the most dramatically during play, it is somewhat surprising and unfortunate that there are such a limited range of approaches to shaft design and manufacturing available to club makers today.

SUMMARY

The disclosure provides methods of making golf club shafts that include a lattice structure, and golf club shafts that are least partially 3D printed. Methods herein include designing a shaft in a computer-assisted drawing (CAD) program, e.g., with a lattice structure at any point therein. Parameters like dimensions and material for an outer layer or dimensions, locations, material, and pore structure for a lattice structure inside of the outer layer can be adjusted in the CAD model. The designed shaft may be created using a large-format 3D printer. Where unlike materials are printed together (e.g., a first material embedded within another, a first material abutting another, or a seamless transition from the first material to the second material), the large-format 3D printer can operate to change input material to form the materials together.

Using 3D printing in the design and manufacture of golf club shafts allows a designer to limit and increase the range of possible motions that the shaft exhibits during regular use. Using methods of the disclosure, a designer has fine-grained control over shaft stiffness and flexibility and can, in fact, control just how stiff versus flexible a shaft is at each cm along its length. Preferred embodiments of the disclosure include methods of making golf club shafts that include a lattice structure, in which the shafts may be made by methods that include 3D printing or similar additive manufacturing methods. For example, a shaft may include a substantially tubular outer shell (e.g., of nylon, carbon fiber, or acrylonitrile butadiene styrene) and may also include a lattice portion within the outer shell, along part or all of the shaft length. The lattice portion may be a 3D printed open-work or porous structure also of a material such as nylon or acrylonitrile butadiene styrene. All or parts of the shaft may be made using a process such as fused deposition modeling (FDM) and any part of the shaft, such as the outer shell, may include carbon threads for added stiffness. Thus, the disclosure provides materials and methods for manufacturing golf shafts that allow for lattice structure to be created in the interior of the shaft.

In certain aspects, the disclosure provides a golf club shaft. The shaft includes an extended body having a tip end and an opposed butt end, wherein a portion of the shaft is made by additive manufacturing. The portion of the shaft made by additive manufacturing may include a lattice structure within an interior of the shaft. The extended body may include an outer layer having a substantially tubular shape. Preferably, a portion of the shaft made by additive manufacturing comprises a lattice structure inside of the outer layer.

In some embodiments, the outer layer and the interior lattice structure are 3D printed together. The outer layer may include nylon or acrylonitrile butadiene styrene. The portion of the shaft made by additive manufacturing may include a 3D-printed lattice structure disposed within the outer layer. In certain embodiments, the outer layer comprises a perimeter of carbon fiber that has been printed and bonded to the 3D-printed lattice structure during the additive manufacturing. The 3D-printed lattice may include a polymer such as nylon.

In certain embodiments, the extended body includes a 3D-printed carbon fiber tube, and the shaft also includes a 3D-printed nylon lattice disposed within at least a portion of the carbon fiber tube. The portion of the shaft that is made by additive manufacturing may include an outer tubular member defining a perimeter of the shaft, and the outer tubular member may be made by fused deposition modeling (FDM). The outer tubular member may include carbon threads. In particular, methods such as FDM or fused filament fabrication (FFF) and other 3D printing methods allow for the outer tubular member to include the carbon threads disposed throughout a matrix of nylon or acrylonitrile butadiene styrene.

In some embodiments, the portion of the shaft that is made by additive manufacturing includes a lattice core disposed within, and along at least a portion of, the extended body. The lattice core may define a substantially porous structure and may be formed by fused deposition modeling (FDM) or other 3D printing methods.

In one aspect, an example golf club shaft is disclosed that includes an extended body and a core. The core is disposed in the extended body.

In another aspect, a golf club shaft is disclosed that includes an extended body and a lattice structure. The lattice structure is bonded to an interior of the extended body.

In another aspect, a golf club shaft is disclosed that includes an extended body and a core. The extended body includes a carbon fiber layer bonded to a polymer layer. The core is disposed in the extended body.

In some aspects, a method for printing a golf club shaft includes steps of receiving a model of the golf club shaft, providing an additive manufacturing system, and manufacturing the model using the additive manufacturing system. The golf club shaft includes an extended body defining a longitudinal axis that extends centrally through a top and bottom of the golf club shaft, and through which a plane extends. The plane defines a first side of the extended body and a second side of the extended body. Additionally, a core is disposed in the extended body and comprises a lattice structure integrally formed with the extended body. The lattice structure extends from an inner surface of the extended body along the first side thereof to the inner surface along the second side thereof. At least a portion of the lattice structure extends through the longitudinal axis.

In some embodiments, a first gap is formed between the top of the golf club shaft and a top of the lattice structure and a second gap is formed between the bottom of the golf club shaft and a bottom of the lattice structure. In some embodiments, the top of the golf club shaft is coextensive with a top of the lattice structure. In some embodiments, the bottom of the golf club shaft is coextensive with a bottom of the lattice structure. In some embodiments, the lattice structure comprises a hub and a plurality of spokes that extend between the hub and the extended body. In some embodiments, the lattice structure has a plurality of segments that extend from the inner surface along the first side of the extended body to the inner surface along the second side of the extended body. In some embodiments, the lattice structure comprises a plurality of trellises.

In some aspects, a method for printing a golf club shaft includes the steps of receiving a model of the golf club shaft, providing an additive manufacturing system, and manufacturing the model using the additive manufacturing system. The golf club shaft includes an extended body defining a longitudinal axis that extends centrally through a top and bottom of the golf club shaft, and through which a plane extends. The plane defines a first side of the extended body and a second side of the extended body. Additionally, a core is disposed in the extended body and comprises a lattice structure integrally formed with the extended body. The lattice structure comprises a plurality of segments that extend from an inner surface of the extended body along the first side thereof to the inner surface along the second side thereof.

In some embodiments, a first gap is formed between the top of the golf club shaft and a top of the lattice structure and a second gap is formed between the bottom of the golf club shaft and a bottom of the lattice structure. In some embodiments, the top of the golf club shaft is coextensive with a top of the lattice structure. In some embodiments, the bottom of the golf club shaft is coextensive with a bottom of the lattice structure. In some embodiments, the lattice structure comprises a hub and a plurality of spokes that extend between the hub and the extended body. In some embodiments, the lattice structure comprises a plurality of outer passages formed by a plurality of inner rings and a plurality of ribs. In some embodiments, the lattice structure comprises an inner passage that is in communication with a plurality of outer passages.

In some aspects, a method for printing a golf club shaft includes the steps of receiving a model of the golf club shaft, providing an additive manufacturing system, and manufacturing the model using the additive manufacturing system. The golf club shaft includes an extended body and a lattice structure integrally formed with the extended body.

In some embodiments, a first gap is formed between a top of the golf club shaft and a top of the lattice structure and a second gap is formed between a bottom of the golf club shaft and a bottom of the lattice structure. In some embodiments, a top of the golf club shaft is coextensive with a top of the lattice structure. In some embodiments, a bottom of the golf club shaft is coextensive with a bottom of the lattice structure. In some embodiments, the lattice structure comprises a plurality of branches that are interconnected to one another to form a plurality of inner rings. In some embodiments, the lattice structure comprises a hub and a plurality of spokes extending between the hub and the extended body.

In some aspects, a golf club shaft including an extended body that includes an outer layer and extends between a butt end and a tip end. The extended body includes at least two unlike materials printed together, and the extended body is unitary.

In some embodiments, the outer layer contains the at least two unlike materials. In some embodiments, the at least two unlike materials includes at least one of a nylon, acrylonitrile butadiene styrene, or carbon fiber material. In some embodiments, the outer layer has a substantially tubular shape. In some embodiments, the extended body defines a longitudinal axis that intersects the butt end and the tip end, the outer layer being coaxial with the longitudinal axis. In some embodiments, the outer layer is coextensive with the butt end and the tip end of the extended body. In some embodiments, the outer layer comprises a perimeter of carbon fiber and the extended body further includes a plurality of ribs disposed inside the outer layer, the plurality of ribs being formed of at least one of a nylon, acrylonitrile butadiene styrene, or carbon fiber material.

In some aspects, a golf club shaft includes a butt end, a tip end, and an extended body that includes an outer layer and defines a length along a longitudinal axis. The length of the extended body includes a first section and a second section that are coaxial with one another relative to the longitudinal axis. The first section comprises a first material that is different from a second material of the second section, and the first and second materials are printed together and the extended body is unitary.

In some embodiments, at least one of the first material and the second material is a metal material. In some embodiments, the first section has a first stiffness that is different from a second stiffness of the second section. In some embodiments, the first section includes a plurality of ribs that at least partially fills an interior cavity of the first section. In some embodiments, the first section extends along the length of the extended body a first distance that is different from a second distance of the second section, the first and second distances being parallel to one another relative to the longitudinal axis. In some embodiments, the first material is carbon fiber and the second material is at least one of a nylon or acrylonitrile butadiene styrene material. In some embodiments, the tip end is adjacent the first section and the second section is disposed between the first section and the butt end.

In some aspects, a golf club shaft includes an extended body defining a longitudinal axis that extends centrally through a tip end and a butt end of the golf club shaft, and through which a plane extends, the plane defining a first side of the extended body and a second side of the extended body. An outer layer is disposed about the longitudinal axis of the extended body. A rib is disposed along a length of the extended body, the rib being intersected by the plane and extending from the first side to the second side. The golf club shaft includes a first material and a second material that is different from the first material. The first and second materials are printed together. The extended body comprises the first material, and at least one of the rib or the outer layer comprises the second material.

In some embodiments, at least one of the first material or the second materials is a metal material. In some embodiments, at least one of the first material or the second material is a non-metal material. In some embodiments, a length of the extended body includes a first section and a second section, and the rib is disposed in the first section. In some embodiments, the rib is disposed in an outer wall of the extended body. In some embodiments, the golf club shaft has a round cross section and tapers in diameter between the tip end and the butt end.

In some aspects, a method of manufacturing a golf club shaft includes designing an extended body that includes an outer layer and extends between a butt end and a tip end. The extended body includes at least two unlike materials, and the extended body is unitary. The method further includes printing the extended body using an additive manufacturing system.

BRIEF DESCRIPTION OF THE DRAWINGS

FIG. 3 is a top view of a second example golf club shaft according to an embodiment of the present disclosure;

FIG. 4 is an end view of the second example golf club shaft of FIG. 3;

FIG. 5 is another end view of the second example golf club shaft of FIGS. 3 and 4;

FIG. 35 is an isometric view of a first example golf club;

FIG. 36 is an isometric view of a second example golf club;

FIG. 37 is an isometric view of a third example golf club;

FIG. 38 is an isometric view of a fourth example golf club;

FIG. 39 is an isometric view of a fifth example golf club;

FIG. 40 is an isometric view of a sixth example golf club; and

FIG. 41 is an isometric view of a seventh example golf club.

DETAILED DESCRIPTION

Figure 1:
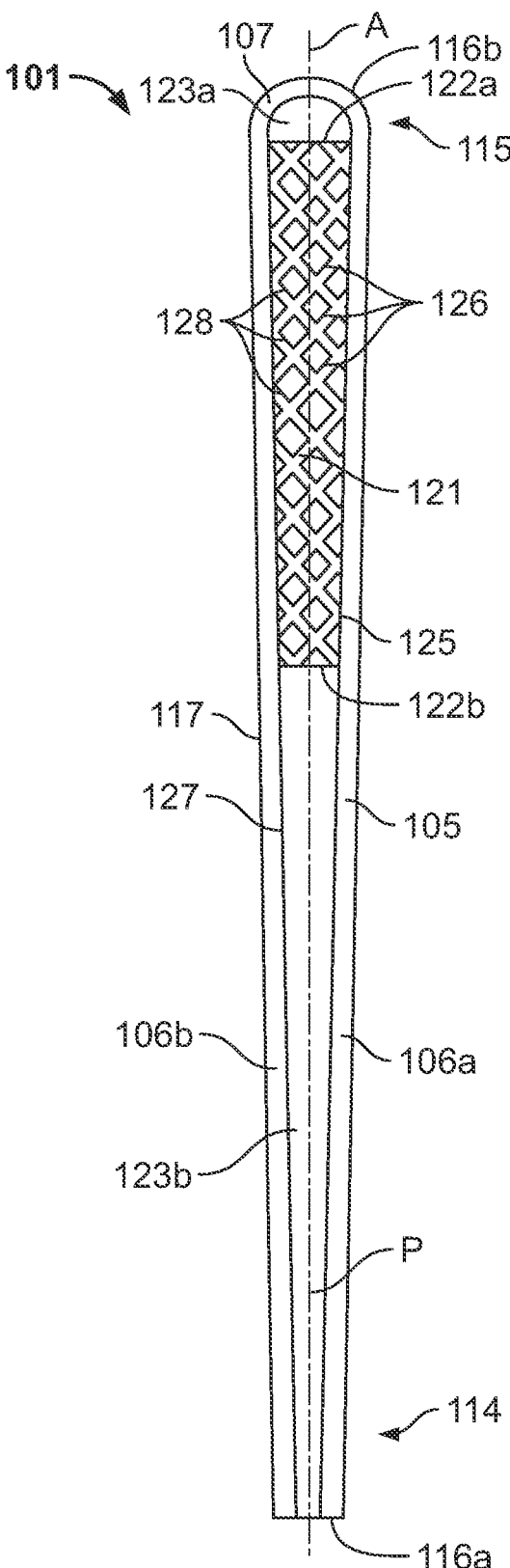
FIG. 1 is a cross-sectional schematic view of a first example golf club shaft including a first example lattice structure according to an embodiment of the present disclosure.

FIG. 1 shows a first example golf club shaft 101. The shaft 101 includes a first example extended body 105 and an end cap 107. The extended body 105 defines a longitudinal axis A through which a plane P extends (shown extending orthogonal to the cross-sectional view of FIG. 1). The plane P defines a first side 106a of the extended body 105 and a second side 106b of the extended body 105. The extended body 105 has a tip end 114 that defines a shaft bottom 116a and an opposed butt end 115 that defines a shaft top 116b. The extended body further defines an outer surface 117. In some embodiments, the tip end 114 is threaded. The shaft 101 further includes a first example lattice structure 121 that includes a top side or lattice structure top 122a and a bottom side or lattice structure bottom 122b. A first gap 123a is formed between the shaft top 116b and the lattice structure top 122a. A second gap 123b is formed between the shaft bottom 116a and the lattice structure bottom 122b. In some embodiments, at least a portion of the shaft 101 is made by additive manufacturing. In some embodiments, the portion of the shaft made by additive manufacturing is the lattice structure 121. Additive manufacturing is also often referred to as 3D-printing. Products made via additive manufacturing are often referred to as additively manufactured and/or 3D-printed. As used herein, the terms "additive manufacturing," "3D-printing," "3D printing," and the like are equivalent to one another. The lattice structure 121 is disposed within an interior cavity 124 of the extended body 105. The extended body 105 may include an outer layer 125 having a substantially tubular shape. In some embodiments, the lattice structure 121 is disposed inside the outer layer 125.

With reference to FIG. 1, in some embodiments, the outer layer 125 and the interior lattice structure 121 are 3D printed together. Thus, in some embodiments, the extended body 105 is unitary. The outer layer 125 may be formed of nylon or acrylonitrile butadiene styrene. In some embodiments, the lattice structure 121 may be 3D-printed separately from the outer layer 125. In certain embodiments, the outer layer 125 comprises a perimeter of carbon fiber that has been printed and bonded to the 3D-printed lattice structure 121 during the additive manufacturing. The 3D-printed lattice structure 121 may include a polymer such as nylon.

With reference to FIG. 1, in certain embodiments, the extended body 105 includes a 3D-printed carbon fiber tube, and the shaft 101 also includes the 3D-printed nylon lattice 121 disposed within at least a portion of the carbon fiber tube extended body 105. In some embodiments, the outer layer 125 may also be made by additive manufacturing to include an outer tubular member defining a perimeter of the shaft 101. In some embodiments, the outer layer 125 is made by fused deposition modeling (FDM). In some embodiments, the outer layer 125 includes carbon threads. In particular, methods such as FDM or fused filament fabrication (FFF) and other 3D printing methods allow for the outer layer 125 to include the carbon threads disposed throughout a matrix of nylon or acrylonitrile butadiene styrene.

With reference to FIG. 1, in some embodiments, the lattice structure 121 is a core disposed within, and along at least a portion of, the extended body 105. The lattice structure 121 includes a plurality of first segments 126 that extend from an inner surface 127 of the extended body 105 along the first side 106a thereof to the inner surface 127 along the second side 106b thereof at a downward angle with respect to the first side 106a. The lattice structure 121 further includes a plurality of second segments 128 that extend from the inner surface 127 of the extended body 105 along the second side 106b thereof to the inner surface 127 along the first side 106a thereof at a downward angle with respect to the second side 106b. The lattice structure 121 may define a substantially porous structure and may be formed by fused deposition modeling (FDM). At least some of the plurality of first segments 126 and the plurality of second segments 128 extend through the longitudinal axis A. At least some of the plurality of first segments 126 and the plurality of second segments 128 are parallel. In some embodiments, the lattice structure 121 is formed in a rectilinear pattern. It should be understood that the lattice structure 121 may be formed in any pattern.

Figure 2:
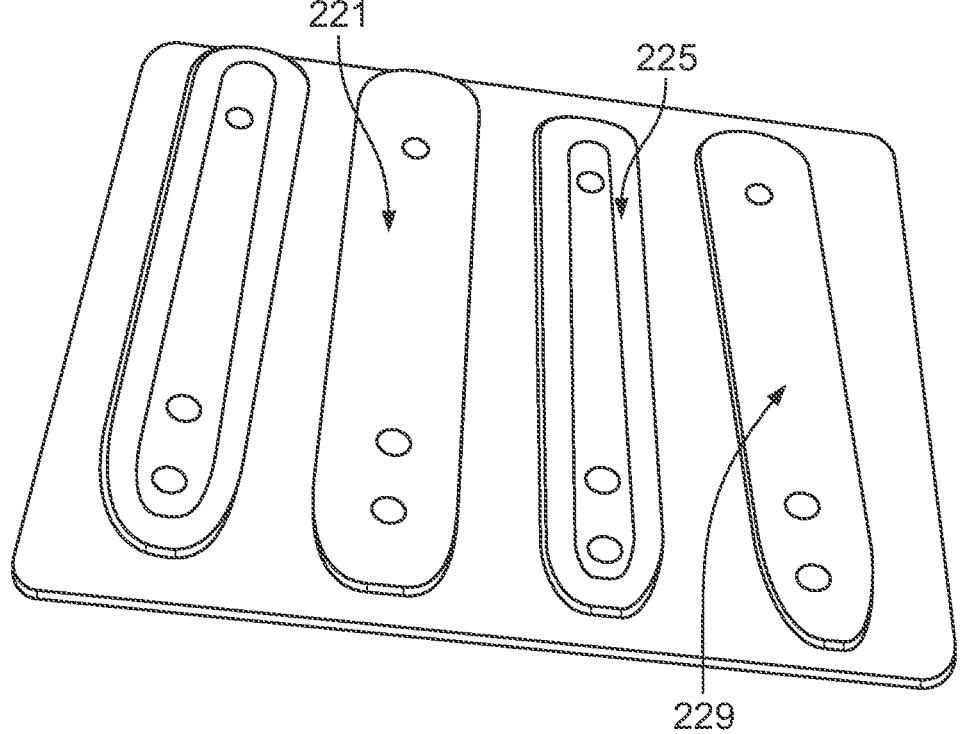
FIG. 2 illustrates segments of a golf club shaft having components that are similar to components of the shaft of FIG. 1.

FIG. 2 shows segments of known materials that illustrate what may be part of a golf club shaft 101 of the disclosure. Combining these materials allows for a shaft of a golf club as discussed hereinafter below having a stiff lattice structure core inside the shaft 101. The materials include a nylon layer 229. The nylon layer 229 may be reinforced with a perimeter of carbon fiber 225 that has been printed and bonded to the nylon layer 229 during the printing process. A structure 221 may be sandwiched or encased within the nylon layer 229 and the carbon fiber 225. With reference to FIG. 1, the shaft 101 may have such a structure along all of, or part of, its length. In some embodiments, the outer layer 125 and the interior lattice structure 121 are 3D printed together. The outer layer 125 may include nylon or acrylonitrile butadiene styrene. The portion of the shaft made by additive manufacturing may include the 3D-printed lattice structure 121 disposed within the outer layer 125. In certain embodiments, the outer layer 125 comprises a perimeter of carbon fiber 225 (shown in FIG. 2) that has been printed and bonded to the 3D-printed lattice structure 121 during the additive manufacturing. The 3D-printed lattice may include a polymer such as the nylon layer 229 (shown in FIG. 2).

Figures 6, 7:
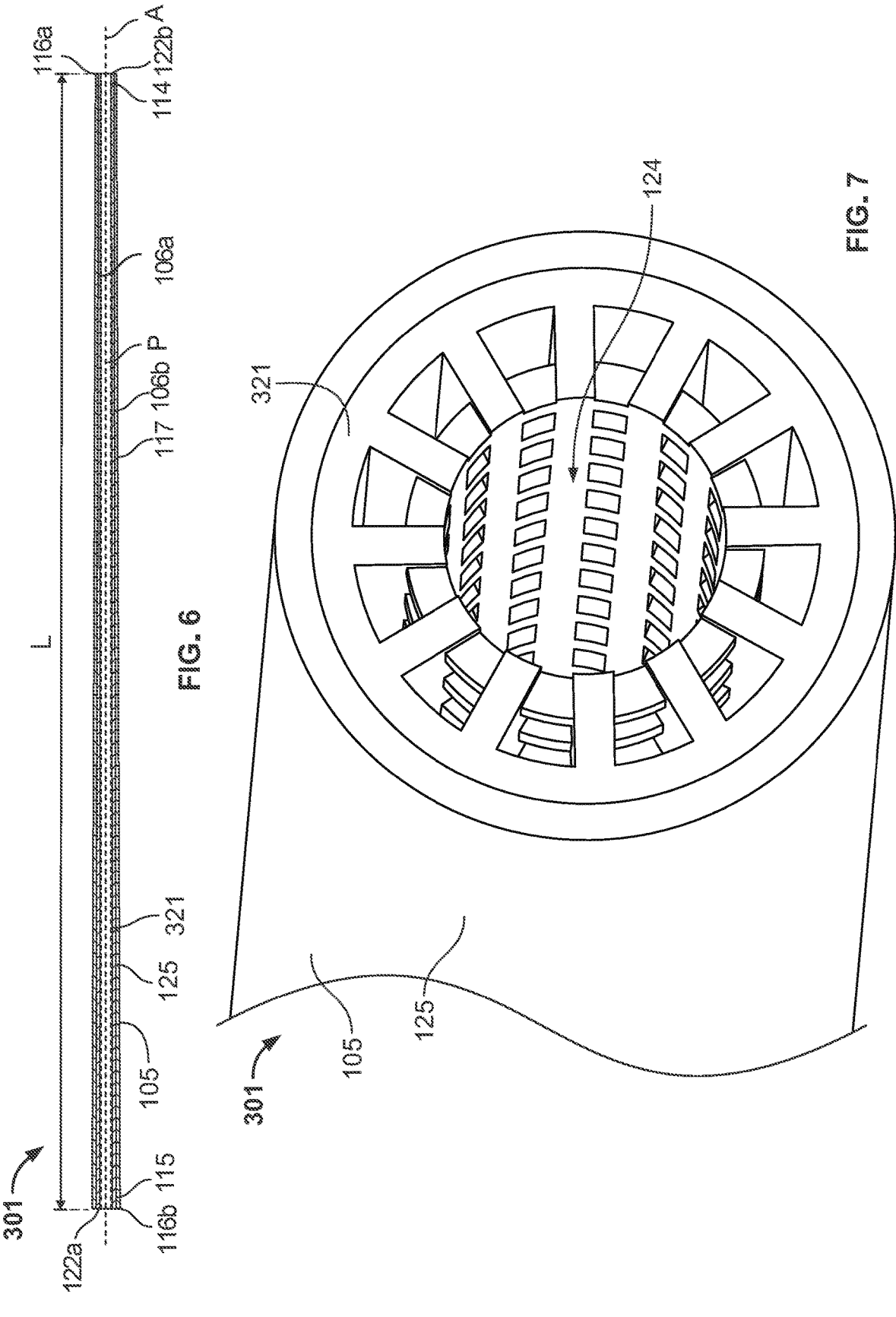
FIG. 6 is a cross-sectional view of the second example golf club shaft of FIGS. 3, 4, and 5 taken along line 6-6 of FIG. 3.
FIG. 7 is a partial isometric cross-sectional view of the second example golf club shaft of FIGS. 3-6 taken along line 7-7 of FIG. 3.
Figures 8, 9, 10:
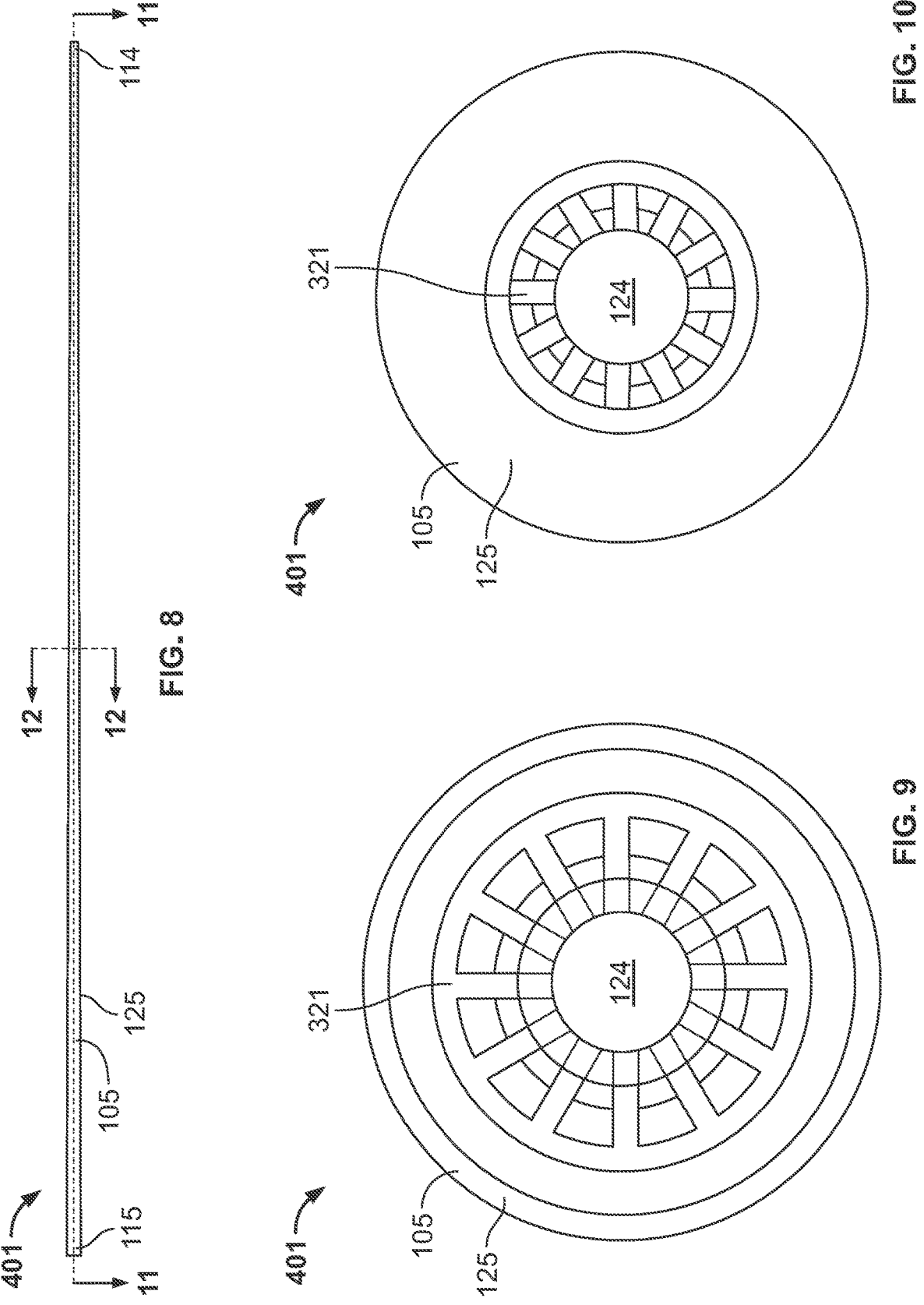
FIG. 8 is a top view of a third example golf club shaft according to an embodiment of the present disclosure.
FIG. 9 is an end view of the third example golf club shaft of FIG. 8.
FIG. 10 is another end view of the third example golf club shaft of FIGS. 8 and 9.

With reference to FIGS. 3-7 a second example golf club 301 is depicted. With reference to FIGS. 4-7, the second example golf club shaft 301 includes the extended body 105 and a second example lattice structure 321. It should be understood that the second example golf club shaft 301 is a variation on the first example golf club shaft 101. To that end, the extended body 105 of the golf club shaft 301 defines the longitudinal axis A through which the plane P extends (shown extending orthogonal to the cross-sectional view of FIG. 6). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 321, like the lattice structure 121, includes the top side or lattice structure top 122a and the bottom side or lattice structure bottom 122b. Looking particularly at FIG. 6, the extended body 105 has a length L. In the second example golf club shaft 301, the lattice structure 321 is continuously disposed in the interior cavity 124 along the length L of extended body 105, such that the lattice structure top 122a is coextensive with the shaft top 116b at the butt end 115 and the lattice structure bottom 122b is coextensive with the shaft bottom 116a at the tip end 114. In other words, the lattice structure 321 fills the interior cavity 124 and internally engages the extended body 105. Thus, the extended body 105 is stiffened by the lattice structure 321 along the entire length L. With reference to FIGS. 4, 5, and 7, in some embodiments the extended body 105 is round in cross section (e.g., circular, ovate, ellipsoid, etc.). Further, in some embodiments, the extended body 105 is tapered from the butt end 114 to the tip end 115. Thus, in some embodiments, the extended body 105 is partially conical. Thus, with reference to FIGS. 4, 5, and 6, in some embodiments, the lattice structure 321 is also tapered. Further, in some embodiments, the lattice structure 321 is partially conical.

With reference to FIGS. 8-12 a third example golf club 401 is depicted. With reference to FIGS. 9-12, the third example golf club shaft 401 includes the extended body 105 and the second example lattice structure 321. It should be understood that the third example golf club shaft 401 is a variation on the first example golf club shaft 101 and the second example golf club shaft 301. To that end, the extended body 105 of the golf club shaft 401 defines the longitudinal axis A through which the plane P extends (shown extending orthogonal to the cross-sectional view of FIG. 11). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 321 includes the top side or lattice structure top 122a and the bottom side or lattice structure bottom 122b. Further, the first gap 123a is formed between the shaft top 116b and the lattice structure top 122a, and the second gap 123b is formed between the shaft bottom 116a and the lattice structure bottom 122b.

Figures 11, 12:
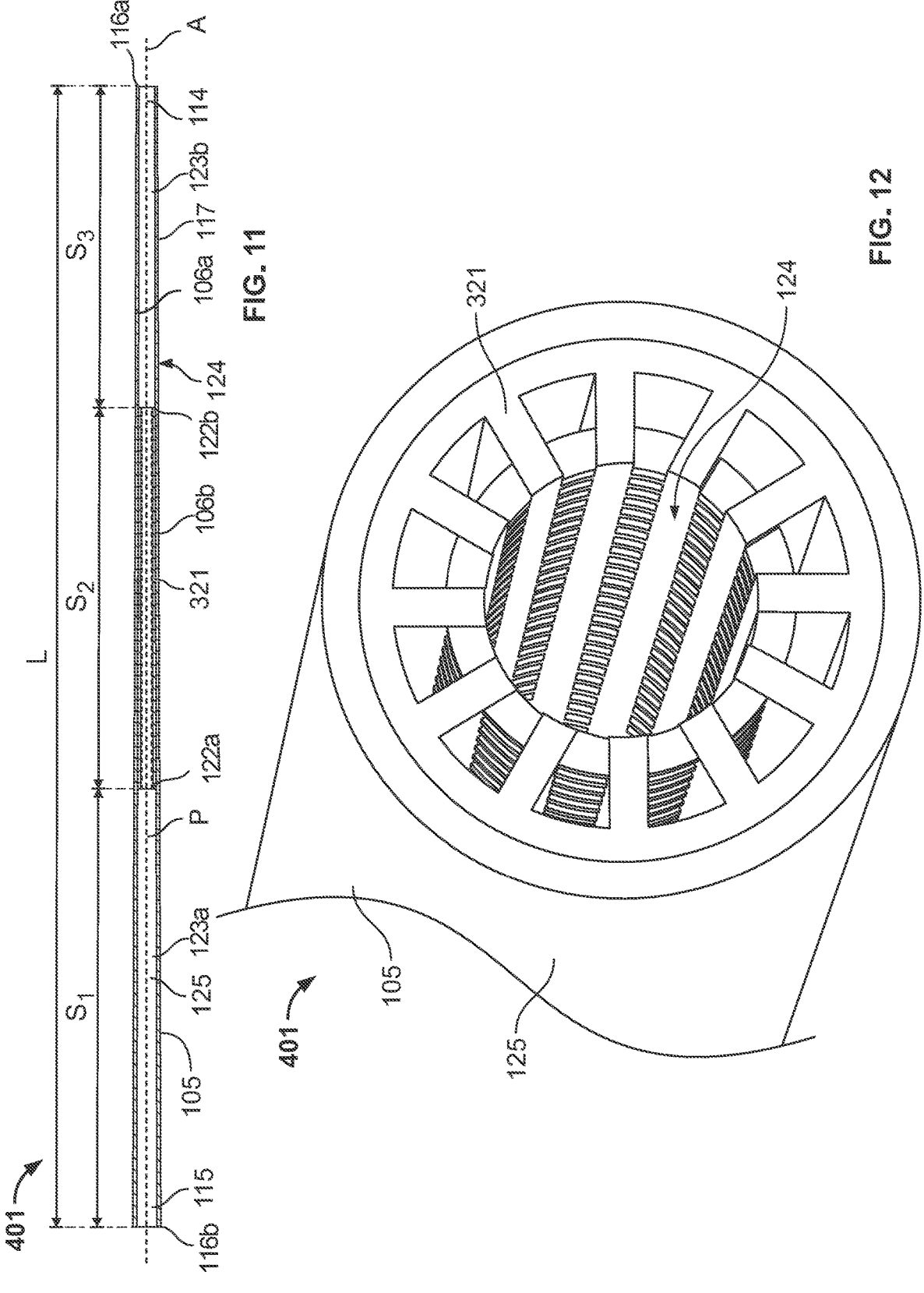
FIG. 11 is a cross-sectional view of the third example golf club shaft of FIGS. 8, 9, and 10 taken along line 11-11 of FIG. 8.
FIG. 12 is a partial isometric cross-sectional view of the third example golf club shaft of FIGS. 8-11 taken along line 12-12 of FIG. 8.

With reference to FIG. 11, the length L of the extended body 105 may be divided into a first section $S_1$, a second section $S_2$, and a third section $S_3$. The second section $S_2$ is between the first section $S_1$ and the third section $S_3$. In the third example golf club shaft 401, the lattice structure 321 is disposed in the interior cavity 124 along the second section $S_2$ of the extended body 105. In other words, the lattice structure 321 partially fills the interior cavity 124 and internally engages the extended body 105. Thus, the lattice structure 321 is disposed in the extended body 105 between the butt end 114 and the tip end 115.

With reference to FIG. 11, the lattice structure 321 is shorter than the extended body 105. Thus, the extended body 105 is stiffened by the lattice structure 321 along the second section $S_2$, respectively, while the first section $S_1$ and the third section $S_3$ remain unstiffened. Thus, the second example golf club shaft 301 is more flexible along the first section $S_1$ and the third section Ss relative to the second section $S_2$. In other words, by varying a length D of the lattice structure 321 and placement of the lattice structure 321 within the extended body 105 along the length L, the golf club shaft 301 may be selectively and/or variably stiffened.

Figures 13, 14, 15:
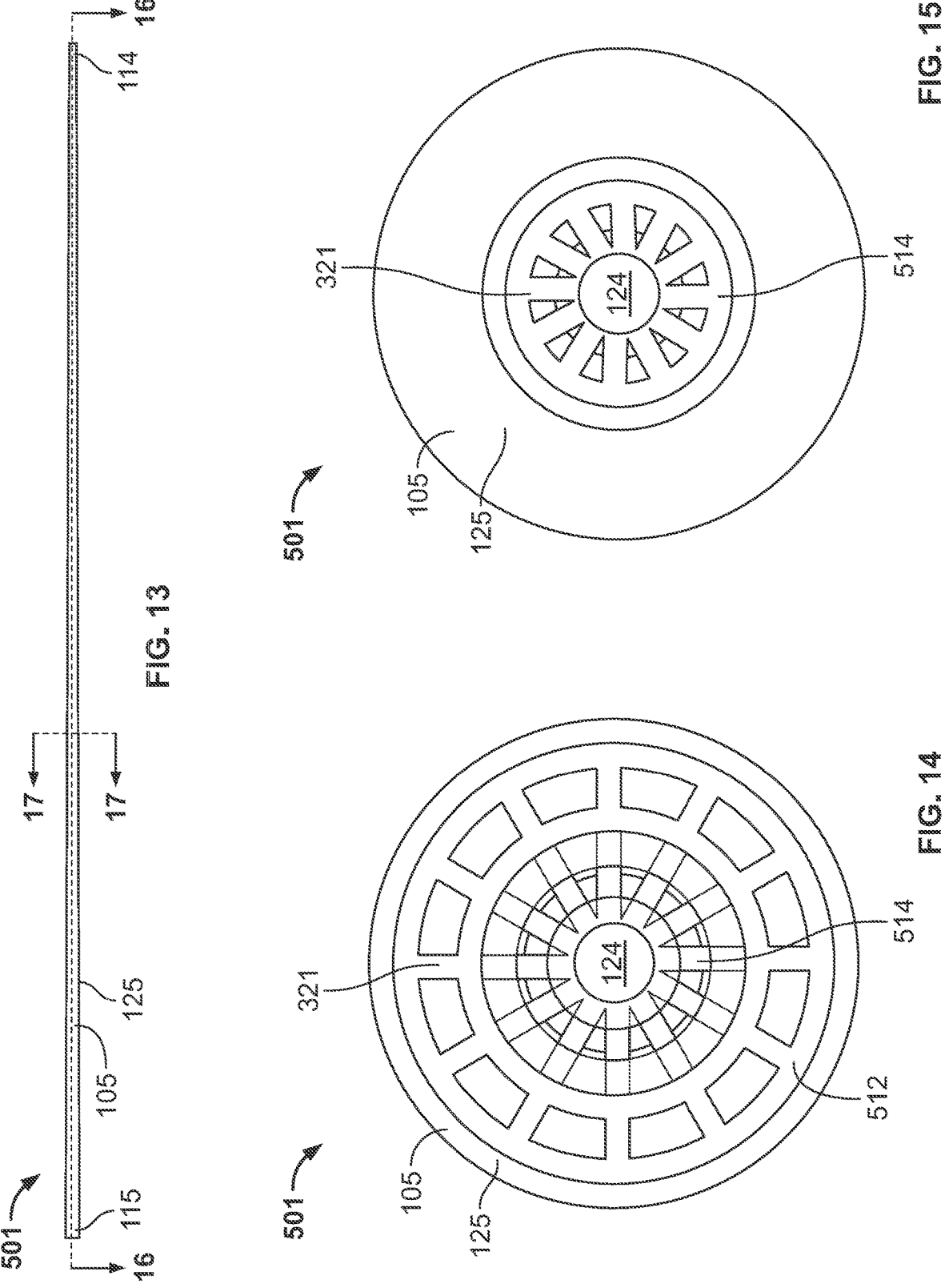
FIG. 13 is a top view of a fourth example golf club shaft according to an embodiment of the present disclosure.
FIG. 14 is an end view of the fourth example golf club shaft of FIG. 13.
FIG. 15 is another end view of the fourth example golf club shaft of FIGS. 13 and 14.
Figures 16, 17:
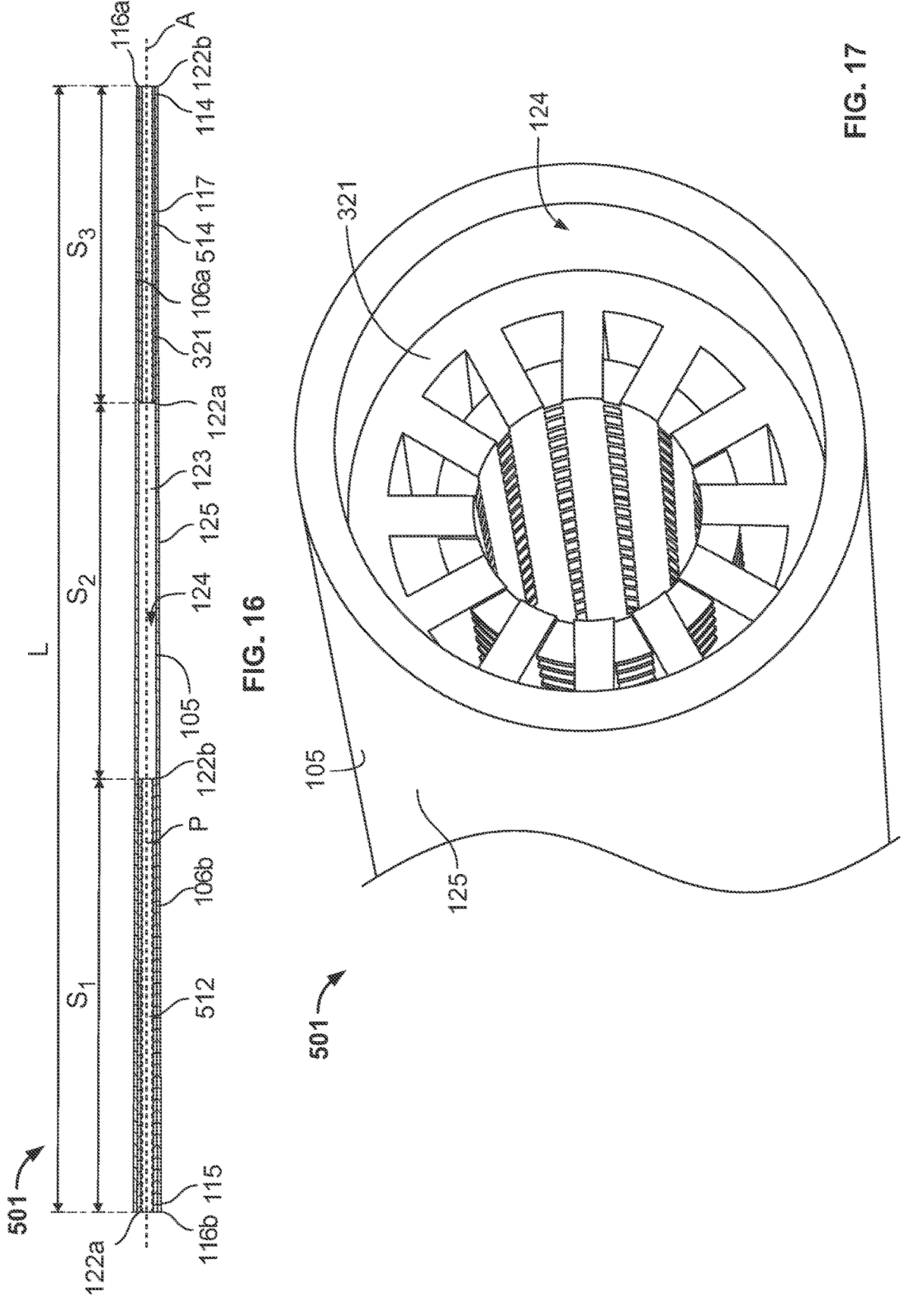
FIG. 16 is a cross-sectional view of the fourth example golf club shaft of FIGS. 13, 14, and 15 taken along line 16-16 of FIG. 13.
FIG. 17 is a partial isometric cross-sectional view of the fourth example golf club shaft of FIGS. 13-16 taken along line 17-17 of FIG. 13.
Figures 18, 19, 20:
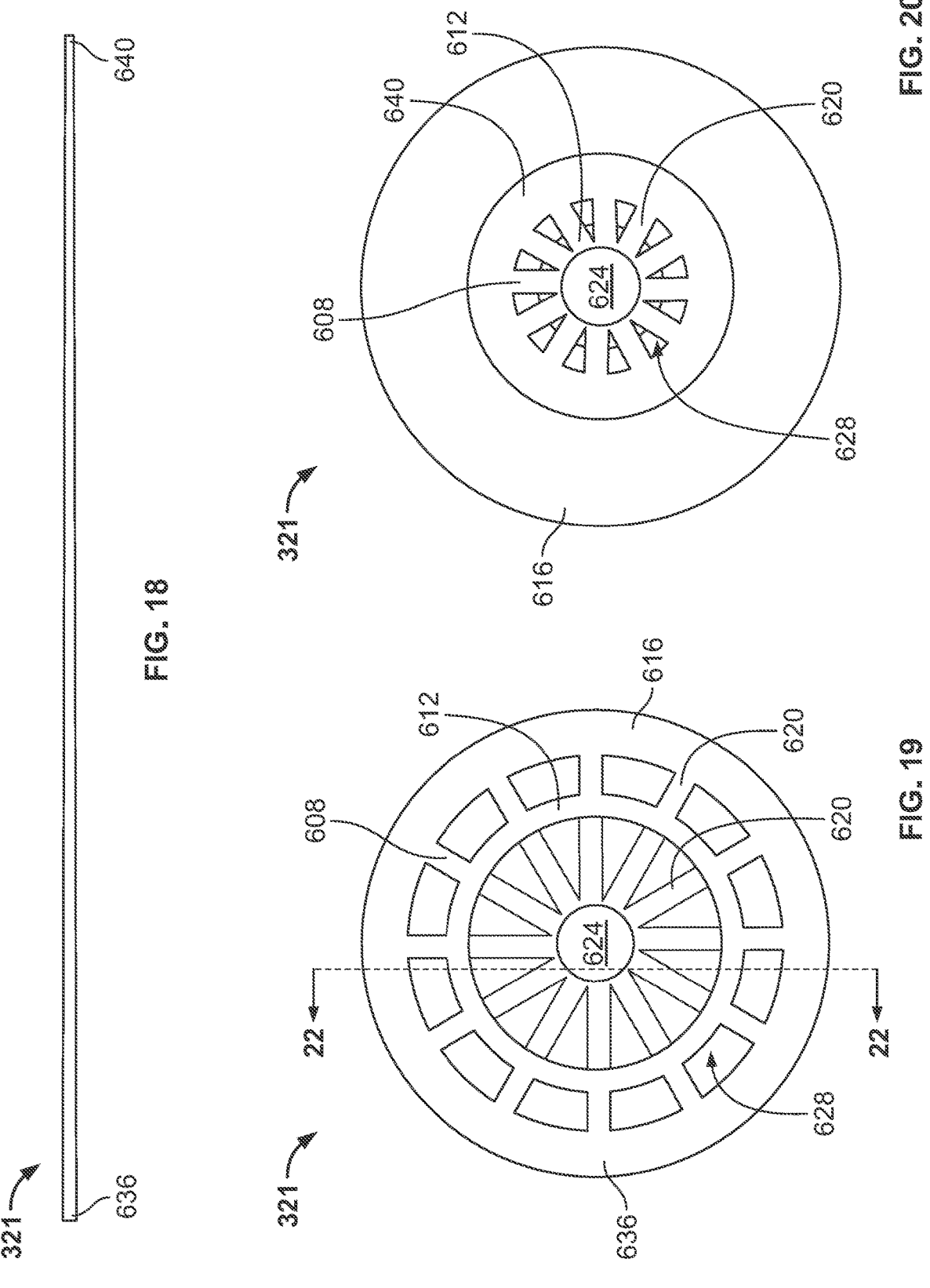
FIG. 18 is a top view of a second example lattice structure according to an embodiment of the present disclosure.
FIG. 19 is an end view of the second example lattice structure of FIG. 18.
FIG. 20 is another end view of the second example lattice structure of FIGS. 18 and 19.
Figure 21:
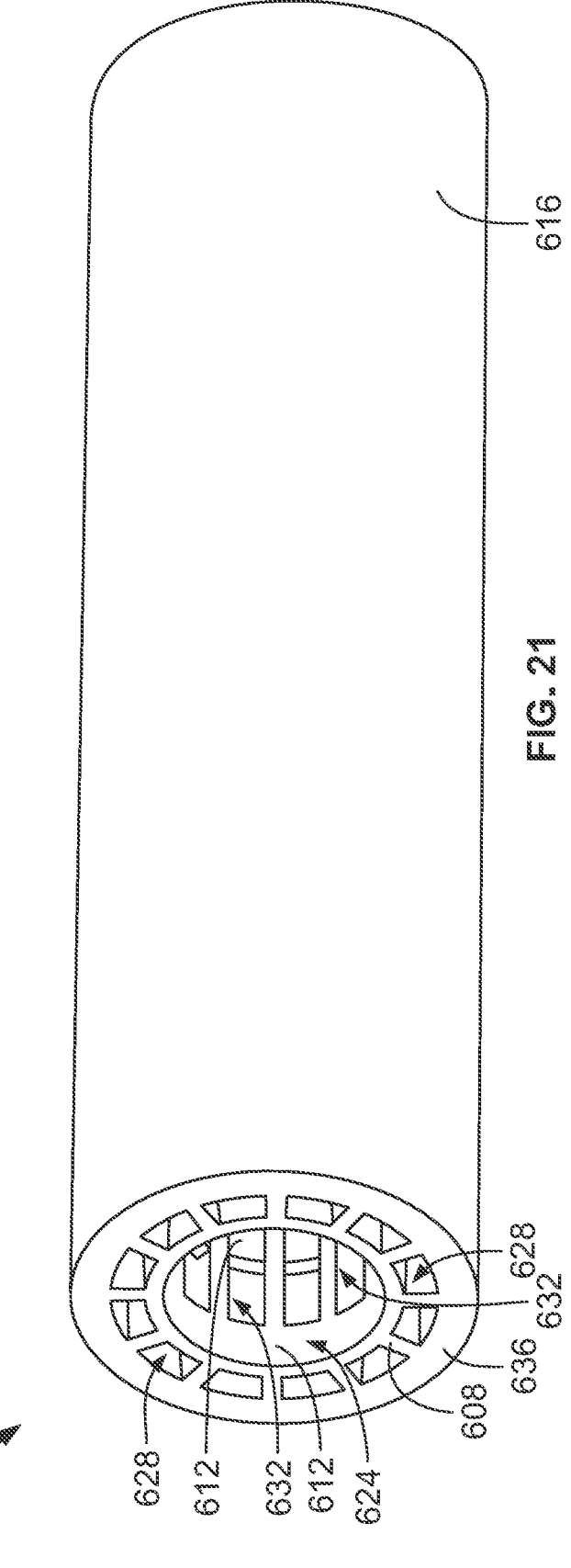
FIG. 21 is a partial isometric view of the second example lattice structure of FIGS. 18, 19, and 20.
Figure 22:
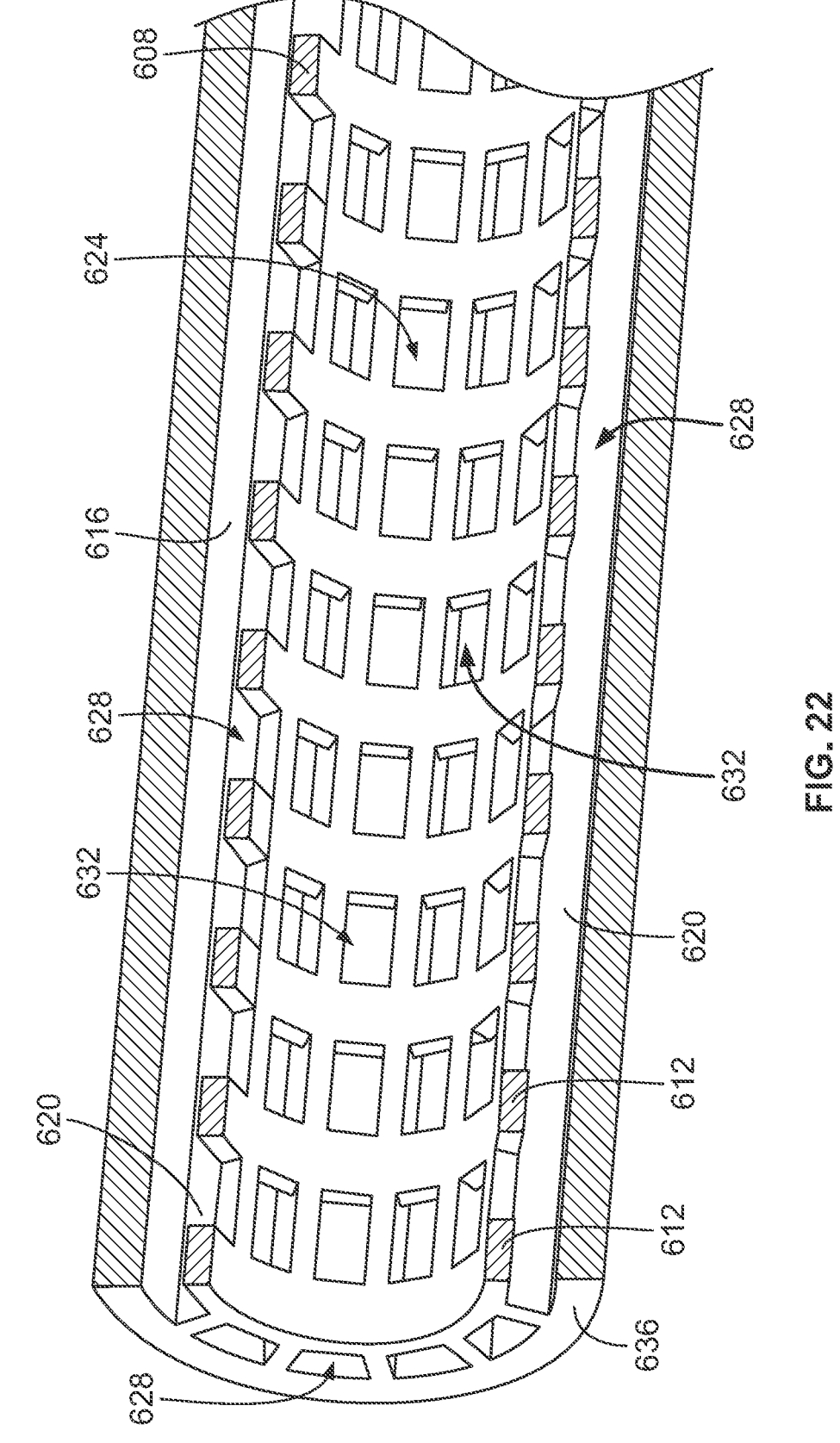
FIG. 22 is a partial isometric cross-sectional view of the second example lattice structure of FIGS. 18-21 taken along line 22-22 of FIG. 19.

With reference to FIGS. 13-17, a fourth example golf club 501 is depicted. With reference to FIGS. 14 and 16, the fourth example golf club shaft 501 includes the extended body 105 a first segment 512 of the second example lattice structure 321 and a second segment 514 of the second example lattice structure 321. It should be understood that the fourth example golf club shaft 501 is a variation on the first, second, and third example golf club shafts 101, 301, 401. To that end, the extended body 105 of the golf club shaft 501 defines the longitudinal axis A through which the plane P extends (shown extending orthogonal to the cross-sectional view of FIG. 16). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 321 includes the top side or lattice structure top 122a and the bottom side or lattice structure bottom 122b.

With reference to FIG. 16, in the fourth example golf club shaft 501, the first segment 512 is disposed in the interior cavity 124 along the first section $S_1$ of the extended body 105 and includes the lattice structure top 122a that is coextensive with the shaft top 116b at the butt end 115 and opposite the lattice structure bottom 122b disposed within the interior cavity 124. Thus, the first segment 512 is shorter than the extended body 105. Further, the second segment 514 is disposed in the interior cavity 124 along the third section Ss of the extended body 105 and includes the lattice structure bottom 122b that is coextensive with the shaft bottom 116a at the tip end 114 and opposite the lattice structure 122a disposed within the interior cavity 124. Thus, the second segment 514 is also shorter than the extended body 105. The gap 123 is formed between the lattice structure top 122a of the second segment 514 and the lattice structure bottom 122b of the first segment 512. In other words, the first segment 512 and the second segment 514 are separate from one another, partially fill the interior cavity 124, and internally engage the extended body 105.

With reference to FIG. 16, the combined length of the first segment 512 and the second segment 514 is shorter than the extended body 105. Thus, the extended body 105 is stiffened by the first segment 512 and the second segment 514 along the first section $S_1$ and the third second Ss while the second section $S_2$ remains unstiffened. Thus, the fourth example golf club shaft 501 is more flexible along the second section $S_2$ relative to the first section $S_1$ and the third section $S_3$. In other words, by varying a first length $D_1$ of the first segment 512 and a second length $D_2$ of the second segment 514 and varying placement of the first and second segments 512, 514 within the extended body 105 along the length L, the golf club shaft 501 may be selectively and/or variably stiffened.

With reference to FIGS. 18-22, an example segment 602 of the second example lattice structure 321 is depicted. It should be understood that the second example lattice structure 321 may be constructed to have any length. Further, as explained above, multiple separate segments of lattice material 321 may be utilized to variably and/or selectively stiffen the extended body 105 (shown in FIGS. 6, 11, and 16). Additionally, one or more segments of the second example lattice structure 321 may be used in conjunction with one or more segments of the first example lattice structure 121 (shown in FIG. 1) to variably and/or selectively stiffen the extended body 105.

With reference to FIGS. 19-22, the lattice structure 321 includes a plurality of lattice branches 608 that are interconnected to one another. The plurality of branches 608 are interconnected to form a plurality of inner rings 612, an outer wall 616, and a plurality of ribs 620. The plurality of inner rings 612 and the plurality of ribs 620 are disposed in the outer wall 616. The plurality of ribs 620 extend inwardly from the outer wall 616 and longitudinally along the outer wall 616. The plurality of ribs 620 connect the outer wall 616 to the plurality of inner rings 612. Additionally, the plurality of ribs 620 connect the inner rings 612 to one another.

With reference to FIGS. 19-22, the plurality of inner rings 612 and the plurality of ribs 620 define an inner passage 624. The outer wall 616, the plurality of inner rings 612, and the plurality of ribs 620 define a plurality of outer passages 628. The plurality of inner rings 612 and the plurality of ribs 620 define a plurality of radial passages 632. The inner passage 624 is in communication with the plurality of outer passages 628 via the plurality of radial passages 632. The outer wall 616 is depicted as generally solid in the examples of FIGS. 18-22. It should be understood that, in some embodiments, the outer wall 616 is perforated to define openings (not shown) in communication with the outer passages 628.

With reference to FIGS. 19-22, the outer wall 616 is round in cross section (e.g., circular, ovate, ellipsoid, etc.) and tapered to follow the taper of the extended body 105 (shown in FIGS. 6, 11, and 16). Thus, in some embodiments, the outer wall 616 is partially conical. Similarly, the inner rings 612 are round in cross section. In some embodiments, the inner rings 612 successively narrow in diameter from a top end 636 to a bottom end 640 to follow the taper of the outer wall 616. Further, with reference to FIGS. 19 and 20, in some embodiments, the ribs 620 approach one another from the top end 636 to the bottom end 640 to follow the taper of the outer wall 616. Thus, in some embodiments, as the ribs 620 approach the bottom end 640, the ribs 620 transitionally connect to one another to form one or more of the inner rings 612.

With reference to FIGS. 23-27, a fifth example golf club shaft 701 is depicted. With reference to FIGS. 24-27, the fifth example golf club shaft 701 includes the extended body 105 and a third example lattice structure 721. It should be understood that the fifth example golf club shaft 701 is a variation on the first, second, third, and fourth example golf club shafts 101, 301, 401, 501. To that end, the extended body 105 of the golf club shaft 701 defines the longitudinal axis A through which the plane P extends (shown extending orthogonal to the cross-sectional view of FIG. 26). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 721, like the lattice structure 121, includes the top side or lattice structure top 122a and the bottom side or lattice structure bottom 122b. It should also be understood that the third example lattice structure 721 may be constructed to have any length. Further, multiple separate segments of third lattice structure 721 may be utilized to variably and/or selectively stiffen the extended body 105. Additionally, one or more segments of the third example lattice structure 721 may be used in conjunction with one or more segments of the first example lattice structure 121 (shown in FIG. 1) and/or the second example lattice structure 321 (shown in FIGS. 19-22) to variably and/or selectively stiffen the extended body 105.

Figures 26, 27:
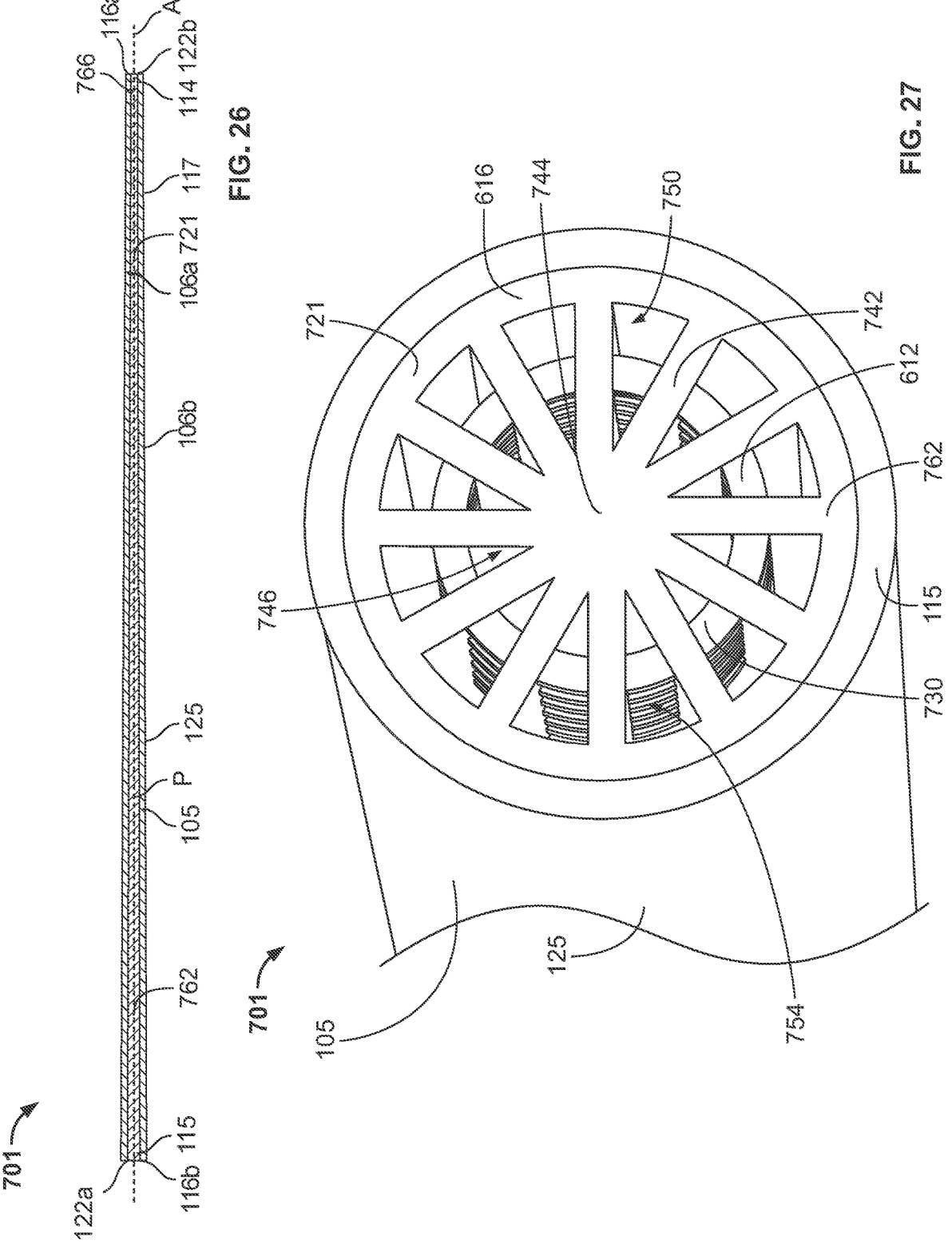
FIG. 26 is a cross-sectional view of the fifth example golf club shaft of FIGS. 24, 24, and 25 taken along line 26-26 of FIG. 23.
FIG. 27 is a partial isometric cross-sectional view of the fifth example golf club shaft of FIGS. 23-27 taken along line 27-27 of FIG. 23.

Looking particularly at FIG. 26, in the fifth example golf club shaft 701, the lattice structure 721 is continuously disposed in the interior cavity 124 along the length L, of extended body 105, such that the lattice structure top 122a is coextensive with the shaft top 116b at the butt end 115 and the lattice structure bottom 122b is coextensive with the shaft bottom 116a at the tip end 114. In other words, the lattice structure 721 fills the interior cavity 124 and internally engages the extended body 105. Thus, the extended body 105 is stiffened by the lattice structure 721 along the entire length L. With reference to FIG. 26, because the extended body 105 is tapered from the butt end 114 to the tip end 115, as explained above, in some embodiments, the lattice structure 721 is also tapered. Thus, with reference to FIGS. 24-27, in some embodiments, the lattice structure 721 is partially conical.

Figures 23, 24, 25:
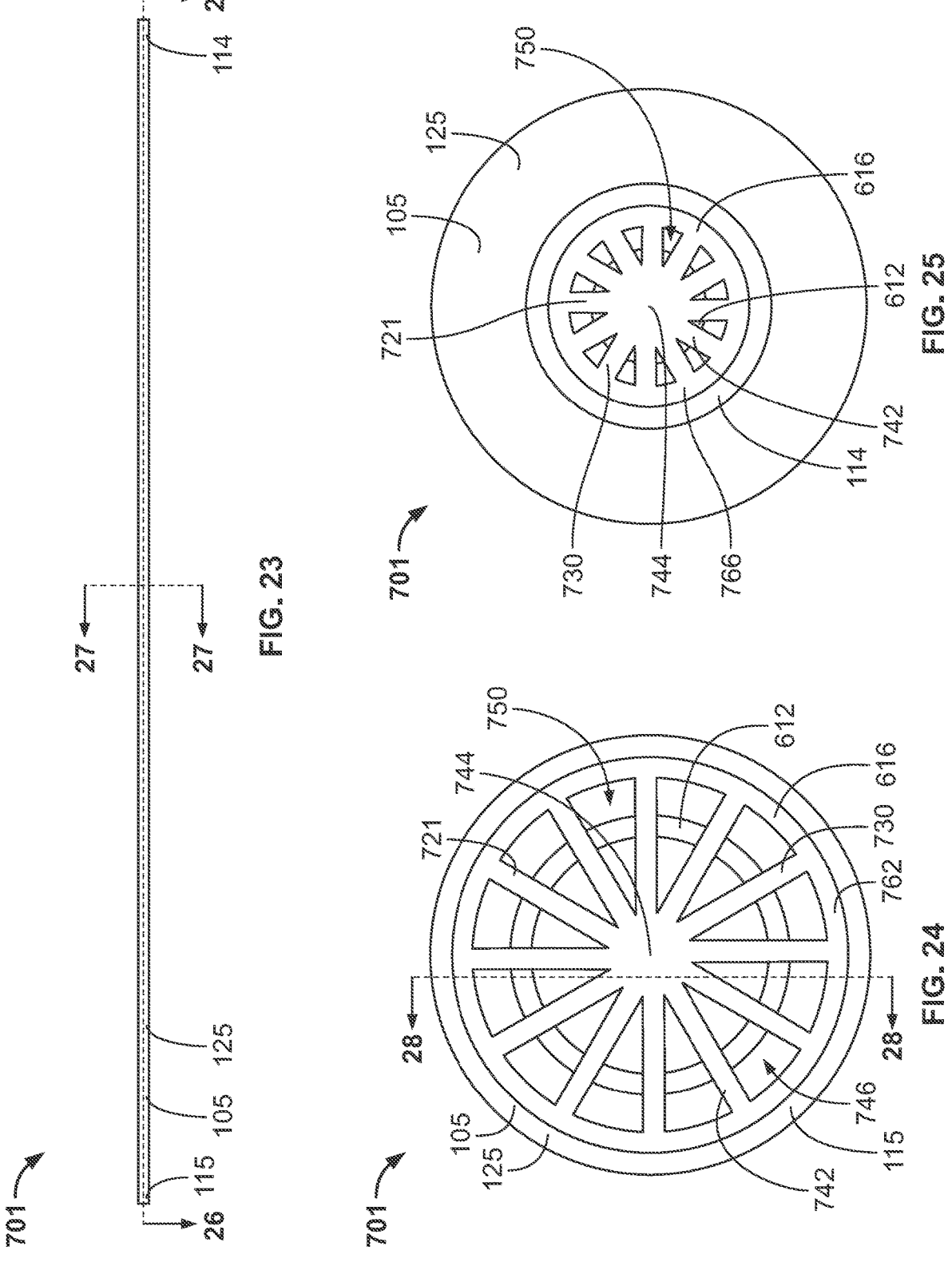
FIG. 23 is a top view of a fifth example golf club shaft according to an embodiment of the present disclosure.
FIG. 24 is an end view of the fifth example golf club shaft of FIG. 23.
FIG. 25 is another end view of the fifth example golf club shaft of FIGS. 23 and 24.

With reference to FIGS. 24, 25, and 27, the second example lattice structure 721 includes a plurality of lattice branches 730 that are interconnected to one another. The plurality of lattice branches 730 are interconnected to form the plurality of inner rings 612, the outer wall 616, a plurality of spokes 742, and a hub 744. The plurality of spokes 742 and the hub 744 are disposed in the outer wall 616. The plurality of spokes 742 extend inwardly from the outer wall 616 and longitudinally along the outer wall 616. The plurality of spokes 742 connect the outer wall 616 to the inner rings 612. The plurality of spokes 742 connect the inner rings 612 to the hub 744. Additionally, the plurality of spokes 742 connect the inner rings 612 to one another.

Figure 28:
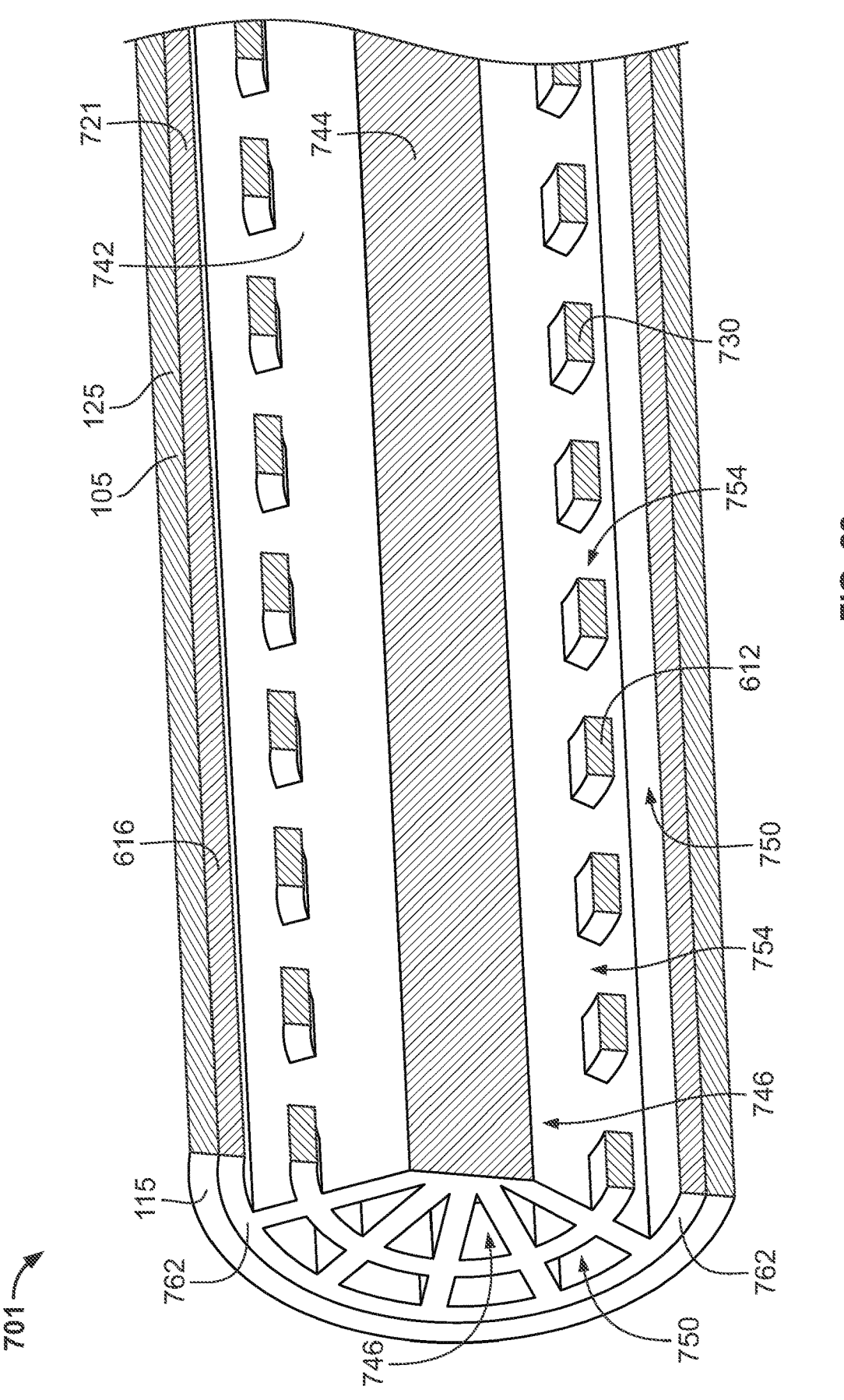
FIG. 28 is a partial isometric cross-sectional view of the fifth example golf club shaft of FIGS. 23-27 taken along line 28-28 of FIG. 24.

With reference to FIGS. 24, 27, and 28, the spokes 742, the inner rings 612, and the hub 744 define a plurality of inner passages 746. In some embodiments, the inner passages 746 are thus triangular and/or pie slice-shaped in cross section. Further, the spokes 742, the outer ring 616, and the inner rings 612 define a plurality of outer passages 750. With reference to FIGS. 27 and 28, the inner rings 612 and the spokes 742 define a plurality of radial passages 754. The inner passages 746 are in communication with the outer passages 750 via the radial passages 754.

With reference to FIGS. 24, 25, 27, and 28, in some embodiments, the inner rings 612 successively narrow in diameter from a top end 762 to a bottom end 766 (shown in FIGS. 25 and 26) to follow the taper of the outer wall 616. Thus, with reference to FIG. 25, in some embodiments, as the inner rings 612 approach the bottom end 766, the inner rings 612 transitionally connect to the hub 744.

Figures 29, 30:
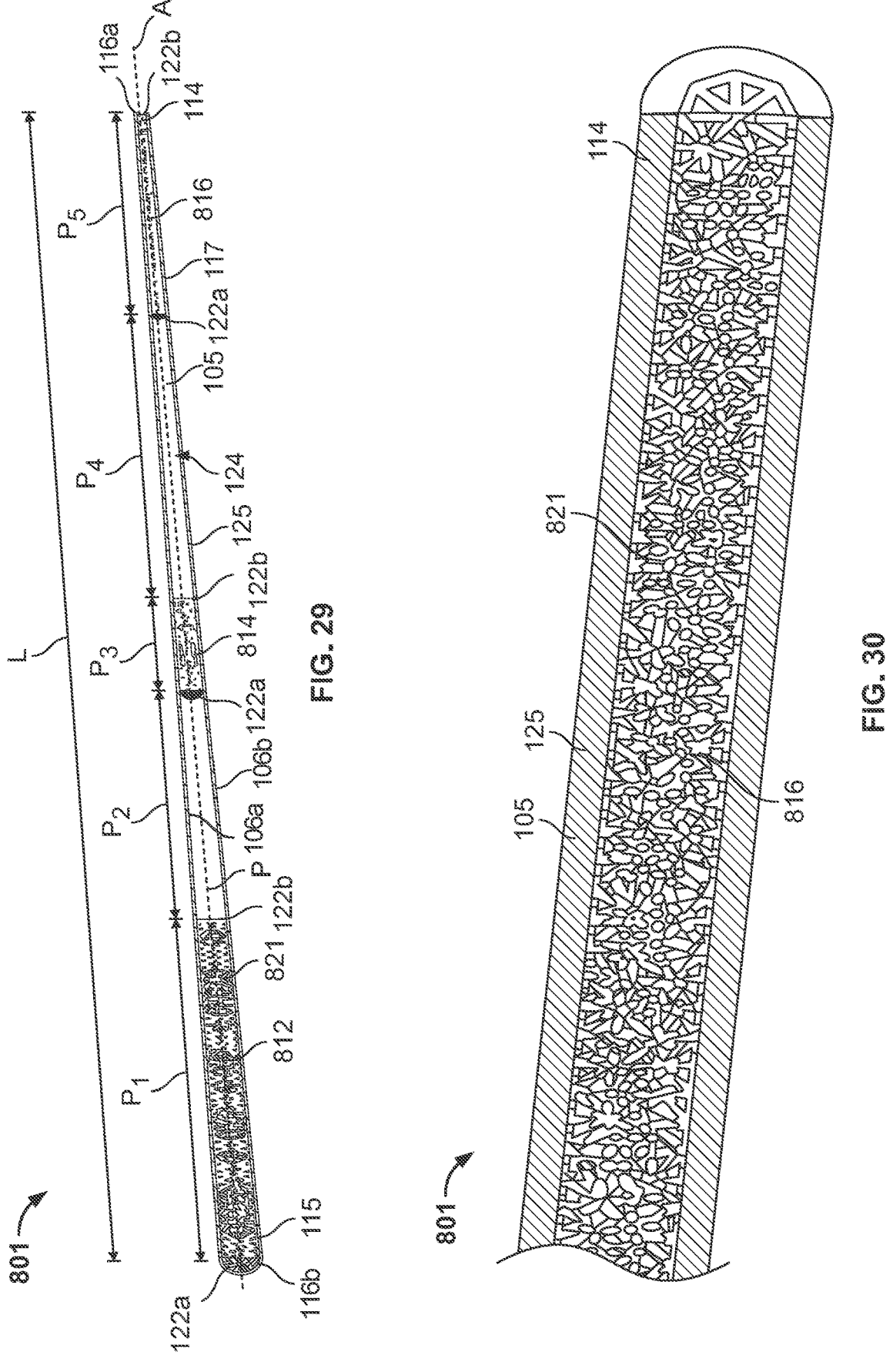
FIG. 29 is a is an isometric cross-sectional view of a sixth example golf club shaft according to an embodiment of the present disclosure.
FIG. 30 is a partial isometric cross-sectional view of the sixth example golf club shaft of FIG. 29.

With reference to FIGS. 29 and 30, a sixth example golf club shaft 801 is depicted. The sixth example golf club shaft 801 includes the extended body 105, a first segment 812, a second segment 814, and a third segment 816. In the sixth example golf club shaft 801, the first segment 812, the second segment 814, and the third segment 816 are formed of a third example lattice structure 821. It should be understood that the sixth example golf club shaft 801 is a variation on the first, second, third, fourth, and fifth example golf club shafts 101, 301, 401, 501, 701. To that end, the extended body 105 of the golf club shaft 801 defines the longitudinal axis A through which the plane P extends (shown extending orthogonal to the cross-sectional view of FIG. 29). The plane P defines the first side 106a of the extended body 105 and the second side 106b of the extended body 105. Further, the extended body 105 includes the tip end 114 that defines the shaft bottom 116a, the opposed butt end 115 that defines the shaft top 116b, and the outer surface 117. In addition, the lattice structure 821, like the lattice structure 121, includes the top side or lattice structure top 122a and the bottom side or lattice structure bottom 122b.

With reference to FIG. 29, the length L of the extended body 105 may be divided into a first portion $P_1$, a second portion $P_2$, a third portion $P_3$, a fourth portion $P_4$, and a fifth portion $P_5$. The second portion $P_2$ is between the first portion $P_1$ and the third portion $P_3$. The third portion $P_3$ is between the second portion $P_2$ and the fourth portion $P_4$. The fourth portion $P_4$ is between the third portion $P_3$ and the fifth portion $P_5$.

With reference to FIG. 29, the first segment 812 is disposed in the interior cavity 124 along the first portion $P_1$ of the extended body 105 and includes the lattice structure top 122a that is coextensive with the shaft top 116b at the butt end 115 and opposite the lattice structure bottom 122b disposed within the interior cavity 12. Thus, the first segment 812 is shorter than the extended body 105. Further, the second segment 814 is disposed in the interior cavity 124 along the third portion $P_3$ of the extended body 105 and includes the lattice structure 122a opposite the lattice structure bottom 122b, both of which are disposed within the interior cavity 124. Thus, the second segment 814 is also shorter than the extended body 105. Further, the third segment 816 is disposed in the interior cavity 124 along the fifth portion $P_3$ of the extended body 105 and includes the lattice structure top 122a disposed within the interior cavity 124 and opposite the lattice structure bottom 122b that is coextensive with the shaft bottom 116a at the tip end 114. Thus, the third segment 816 is also shorter than the extended body 105. In other words, the first segment 812, the second segment 814, and the third segment 816 are separate from one another, partially fill the interior cavity 124, and internally engage the extended body 105. With reference to FIG. 29, because the extended body 105 is tapered from the butt end 114 to the tip end 115, as explained above, in some embodiments, the first segment 812, the second segment

814, and the third segment 816 are also tapered. Thus, with reference to FIG. 29, in some embodiments, the first segment 812, the second segment 814, and the third segment 816 are partially conical.

With reference to FIG. 29, the combined length of the first segment 812, the second segment 814, and the third segment 816 is shorter than the extended body 105. Thus, the extended body 105 is stiffened by the first segment 812, the second segment 814, and the third segment 816 along the first portion $P_1$, the third portion $P_3$, and the third portion $P_3$, respectively, while the second portion $P_2$ and the fourth portion $P_4$ remain unstiffened. Thus, the sixth example golf club shaft 801 is more flexible along the second portion $P_2$ and the fourth portion $P_4$ relative to the first portion $P_1$, the third portion $P_3$, and the third portion $P_3$. In other words, by varying a first length IDI of the first segment 812, a second length $D_2$ of the second segment 814, and a third length $D_3$ of the third segment 816 and varying placement of the first, second, and third segments 812, 814, 816 within the extended body 105 along the length L, the golf club shaft 801 may be selectively and/or variably stiffened.

Figures 31, 32:
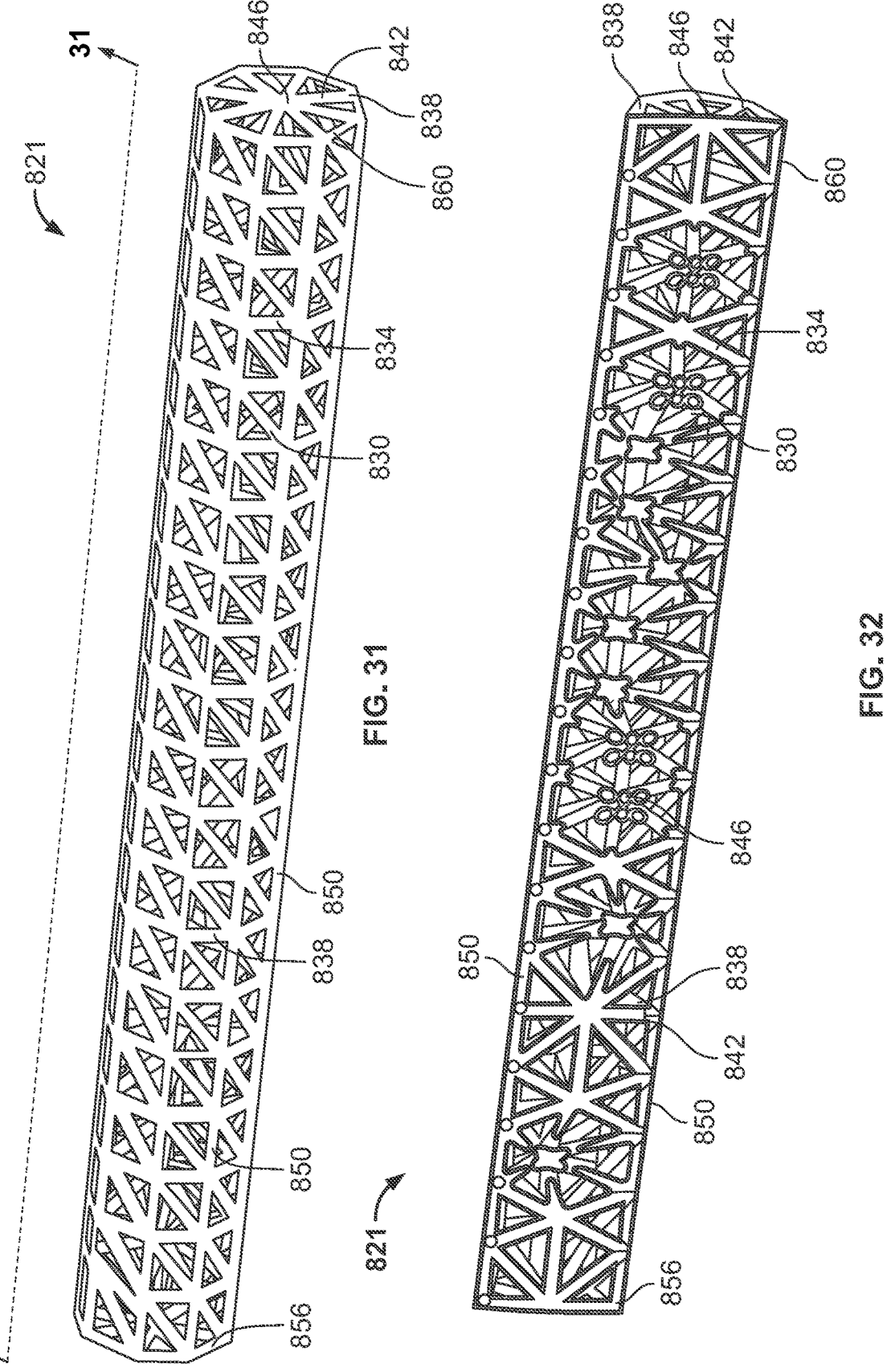
FIG. 31 is an isometric view of a fourth example lattice structure according to an embodiment of the present disclosure.
FIG. 32 is an isometric cross-sectional view of the fourth example lattice structure of FIG. 31 taken along line 32-32 of FIG. 31.

With reference to FIGS. 31 and 32, the fourth example lattice structure 821 is depicted. The fourth example lattice structure 821 includes a plurality of lattice branches 830 that are interconnected with one another to form a plurality of trellises 834. It should be understood that each trellis 834 is a triangular grouping of three neighboring lattice branches 830 connected to one another. Individual lattice branches 830 may belong to one or more trellises 834. The plurality of trellises 834 are connected to form a plurality of rings 838, a plurality of spokes 842, a plurality of hubs 846, and a plurality of outer ribs 850. The spokes 842 and the hubs 846 are disposed in the rings 838. The spokes 842 extend inwardly from the rings 838 to connect with one another and form the hubs 744. Additionally, the outer ribs 850 connect the rings 838 to one another.

With reference to FIGS. 31 and 32, in some embodiments, the rings 838 successively narrow in diameter from a top end 856 to a bottom end 860 to follow the taper of the extended body 105 (shown in FIGS. 28 and 29). Further, in some embodiments, the outer ribs 850 approach one another from the top end 856 to the bottom end 860 to follow the taper of the extended body 105.

Figures 33, 34:
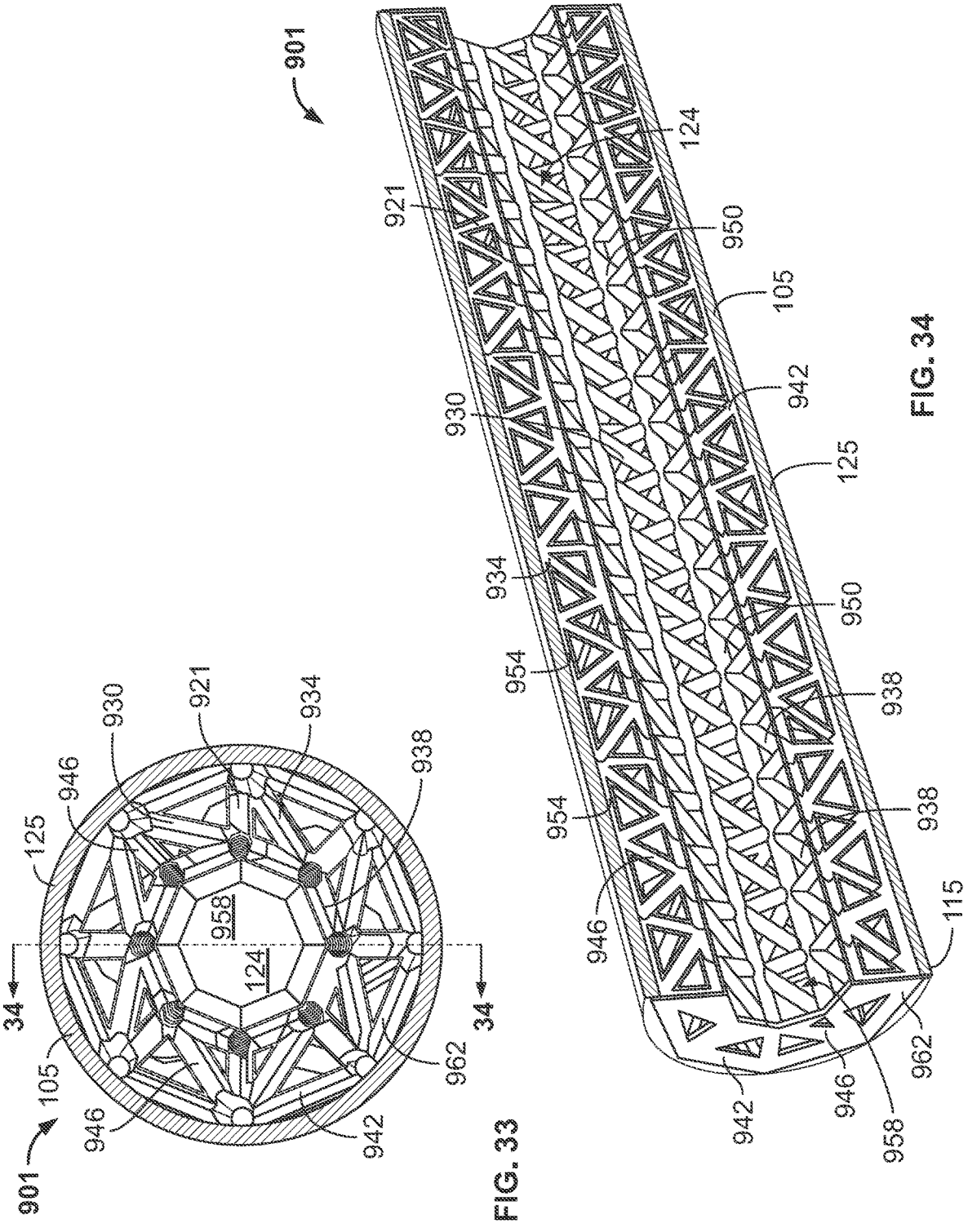
FIG. 33 is an end view of a seventh example golf club shaft according to an embodiment of the present disclosure.
FIG. 34 is a partial isometric cross-sectional view of the seventh example golf club shaft of FIG. 33 taken along line 34-34 of FIG. 33.

With reference to FIGS. 33 and 34, a seventh example golf club shaft 901 is depicted. The seventh example golf club shaft 901 includes the extended body 105 and a fifth example lattice structure 921. It should be understood that the seventh example golf club shaft 901 is a variation on the first, second, third, fourth, fifth, and sixth example golf club shafts 101, 301, 401, 501, 701, 801.

With reference to FIGS. 33 and 34, the fifth example lattice structure 921 includes a plurality of lattice branches 930 that are interconnected with one another to form a plurality of trellises 934. It should be understood that each trellis 934 is a triangular grouping of three lattice branches 930 connected to one another. Individual lattice branches 930 may belong to one or more trellises 934. The plurality of trellises 934 are connected to form a plurality of inner rings 938, a plurality of outer rings 942, and a plurality of radial connectors 946. The plurality of radial connectors 946 extend between and connect the plurality of inner rings 938 to the plurality of outer rings 942. With reference to FIG. 34, the plurality of trellises are also connected to form a plurality of inner ribs 950 and a plurality of outer ribs 954. The plurality of inner ribs 950 connect the plurality of inner rings 938 to one another. The plurality of outer ribs 954 connect the plurality of outer rings 942 to one another. The plurality of inner rings 938 and the plurality of inner ribs 950 define an inner passage 958.

With reference to FIG. 34 the inner rings 938 and the outer rings 942 successively narrow in diameter from a top end 962 to a bottom end (not shown) to follow the taper of the extended body 105. Further, in some embodiments, the inner ribs 950 and the outer ribs 954 approach one another from the top end 962 to the bottom end to follow the taper of the extended body 105.

With reference to FIGS. 1, 6, 11, 16, 26, 29, and 34 respectively, the golf club shafts 101, 301, 401, 501, 701, 801, 901, instead of varying wall thickness of the outer layer 125 and location to influence stiffness, may utilize the addition of one or more of the first, second, third, fourth, and fifth lattice structures 121, 321, 721, 821, 921 to adjust stiffness in a particular section along the extended body 105 without adding thickness. The shafts 101, 301, 401, 501, 701, 801, 901 may be described according to their shaft cross section. The shafts 101, 301, 401, 501, 701, 801, 901 are preferably made by fused deposition modeling (FDM).

With reference to FIGS. 1, 6, 11, 16, 26, 29, and 34 respectively, using FDM techniques, carbon threads may be added to the perimeters of the shafts 101, 301, 401, 501, 701, 801, 901.

With reference to FIGS. 1, 6, 11, 16, 26, 29, and 34 respectively, making the shafts 101, 301, 401, 501, 701, 801, 901 includes creating at least a portion of the shafts 101, 301, 401, 501, 701, 801, 901 with a 3D printer. If the 3D-printed portion is to be as long as the finished shafts 101, 301, 401, 501, 701, 801, 901, it may be preferable to use a 3D printing system that can print an object with a dimension as long as the golf club shafts 101, 301, 401, 501, 701, 801, 901. For example, it may be beneficial to use a 3D printing system that can print at least about 1300 mm (e.g., approx. 48 inches) in one direction.

With reference to FIGS. 1, 6, 11, 16, 26, 29, and 34 respectively, in some embodiments, the shafts 101, 301, 401, 501, 701, 801, 901 may be 3D printed piecemeal in sections shorter than the length L. The sections may then be assembled together to reach the designed length L of the shafts 101, 301, 401, 501, 701, 801, 901.

One suitable 3D printing system may use the industrial 3D printer sold under the trademark BIGREP PRO by BigRep America Inc. (Woburn, MA). The BigRep PRO is a large scale material extrusion 3D printer that uses a dual metering extrusion system (MXT) which enables a fast print speed (up to 600 mm/s) and build rate (400 cm$^3$/hour). The printer includes a humidity-controlled filament spool chamber, closed print chamber, and a CNC closed loop motion control system.

Another suitable 3D printing system that may be used with methods and devices of the disclosure includes the 3D printer sold under the model number EB 2076 LX by Erectorbot, Inc. (Anza, CA). Another suitable 3D printing system that may be used with methods and devices of the disclosure includes the 1500×1100×1500 mm 3D printer sold under the trademark THE BOX by BLB Industries (Varnamo, Sweden). Another suitable 3D printing system that may be used with methods and devices of the disclosure includes one of the 3D printers sold under model number T3000 or T3500 by Tractus3D (Ammerzoden, The Netherlands). Another suitable 3D printing system that may be used with methods and devices of the disclosure includes the FDM 3D printer sold under the model name CoLiDo H4080 by Print-Rite N.A. Inc. (San Francisco, CA). Another suitable 3D printing system that may be used with methods and devices of the disclosure includes the 3D printer sold under the model name DeltaWASP 3MT by WASP c/o CSP S.r.l. (Massa Lombarda, Italy). Another suitable 3D printing system that may be used with methods and devices of the disclosure includes the 3D printer sold as the 400 Series Workbench Xtreme by 3D Platform (Roscoe, IL). Another suitable 3D printing system that may be used with methods and devices of the disclosure includes the 3D printer sold under the trademark THE ATLAS by Titan Robotics (Colorado Springs, CO). Another suitable 3D printing system that may be used with methods and devices of the disclosure includes the 3D printer sold under the trademark CHEETA PRO by Fouche 3D Printing (Kempton Park, South Africa). Another suitable 3D printing system that may be used with methods and devices of the disclosure includes the 3D printer sold under the trademark EXTREME BUILDER 2000 by Builder 3D Printers B.V. (The Netherlands). Another suitable 3D printing system that may be used with methods and devices of the disclosure includes the large format 3D printer sold under the trademark DELTAZILLA by OTC Innovations Inc dba Zilla3D/Diygranite (Livermore, CA). Another suitable 3D printing system that may be used with methods and devices of the disclosure includes the 3D printer sold under the trademark THE LEAPFROGX-CEL by Leapfrog (The Netherlands).

Many 3-D printers have the ability to print in a polymer or similar material such as acrylonitrile butadiene styrene (ABS), carbon (e.g., often carbon filaments or similar material in a plastic or polymer matrix), engineering polylactic acid (E-PLA), flexible combinations of plastic and rubber, high-impact polystyrene (HIPS), co-polyester (CPE), nylon, polyethylene terephthalate (PETG), polypropylene (PP), and scaffold soluble support filament (for complex geometric parts). Some 3D printers can create objects from metal by, for example, direct laser metal sintering. Some 3D printers can create objects from metal by, for example, binder jetting. Some 3D printers can create objects with strands of carbon disposed therein throughout or in select locations. Most 3-D printers that have the ability to print with strands of carbon primarily print in a polymer such as acrylonitrile butadiene styrene (ABS) or nylon.

ABS (Acrylonitrile Butadiene Styrene) has strong material properties which produce parts with high impact, high-temperature resistance. Carbon filament is great for printing strong and durable parts and often contains additional printing materials within its composition (ABS, PETG, NYLON etc.) depending on the product needed. Engineering PLA (Polylactic Acid) is a biodegradable plastic that was formulated to provide greater durability than standard PLA without compromising on its eases of use when printing. Some filaments use a combination of plastic and rubber for the creation of flexible prints with elastic properties. Polyethylene terephthalate is considered the bridge in terms of mechanical properties between PLA and ABS, offering strength, impact resistance and chemical resistance without having issues like warping. Having similar properties to PLA and ABS, PETG is a great filament for a number of applications that require more durability than PLA can offer, while being easier to print with than ABS. Using any of such materials in any combination, a user may produce a golf club shaft with any desirable stiffness or flex and other properties of the disclosure. The stiffness, flex, and feel of a shaft may be evaluated by comparing one shaft to another according to standardized metrics established in the art. One such standardized metric established in the art as a basis for comparing shafts is the EI curve.

The EI curve gives an engineering description of a flex profile as the variation of EI along the shaft. EI is a structural term, the abbreviation of "E times/", where: E stands for "modulus of elasticity", and/stands for "area moment of inertia".

E gives a measure of the stiffness of the material. In particular, E says how much force it takes to stretch the material a given amount. Steel would have a very high E, and rubber a very low E.

I gives a measure of stiffness of the cross sectional geometry of the shaft. Thicker walls or a bigger diameter make for a higher I.

EI measurements include the local stiffness at a location "X" along a given shaft. EI measurements are not an average from X to a tip of the shaft.

For a beam supported at two points with a force applied halfway between those points, the beam will be deflected (bent) by the force. The formula for deflection at the middle, where the force is applied, is described by Equation 1, below.

$$y = \frac{FL^3}{48EI} \qquad \text{Equation 1}$$

In Equation 1, y is the deflection measured downwardly from an initial position while no force is applied; F is the force; L is the length between the supports; and EI is the stiffness of the given shaft.

To measure the EI along a shaft, part of the shaft is supported between two points and a force is applied in the middle between the supports. EI may be computed by solving Equation 1 above into Equation 2 below:

$$EI = \frac{FL^3}{48y} \qquad \text{Equation 2}$$

With reference to FIG. 1, in general, because the stiffness of a golf shaft varies along its length; the EI may be higher at the butt end 115 than at the tip end 114 (e.g., 3 to 4 times higher). An EI profile is a graph of the EI over the length of the extended body 105. Shaft performance is usually described by an EI curve. The lattice structures 121, 321, 721, 821, 921 (shown in FIGS. 1, 22, 28, 30, and 34 respectively) may be added to the extended body 105 to influence the EI curve and performance. The lattice structures 121, 321, 721, 821, 921 may be created with 3-D printing to have varying element sizes, varying element lengths, different structures, and in various sections of the shaft to tailor the EI curve and performance.

With reference to FIGS. 1, 6, 11, 16, 26, 29, and 34 respectively, the disclosed golf club shafts 101, 301, 401, 501, 701, 801, 901 and methods of making them involve 3D printing. Using 3D printing, a designer has fine-grained control over shaft stiffness and flexibility. Embodiments include methods of making golf club shafts 101, 301, 401, 501, 701, 801, 901 that include one or more of the lattice structures 121, 321, 721, 821, 921, in which the shafts 101, 301, 401, 501, 701, 801, 901 may be made by methods that include 3D printing or similar additive manufacturing methods.

With reference to FIGS. 1, 6, 11, 16, 26, 29, and 34 respectively, to make the golf club shafts 101, 301, 401, 501, 701, 801, 901 of the disclosure, a user may create models of one or more of the shafts 101, 301, 401, 501, 701, 801, 901 in a computer-assisted drawing (CAD) program. The user may add one or more of the lattice structures 121, 321, 721, 821, 921 at any point within the extended body 105, in the CAD model. The user can print the model using one of the large-format 3D printers disclosed above. The user can then measure the EI of the 3D printed shaft. The user can then view the measured EI curve. The user can adjust parameters of the CAD model of the shaft.

With reference to FIGS. 1, 6, 11, 16, 26, 29, and 34, parameters that can be adjusted in the CAD model include dimensions and material for the extended body 105 (generally having a substantially tubular shape) as well as dimensions, locations, material, and pore structure for the lattice structures 121, 321, 721, 821, 921 inside of the extended body 105. Material can also be varied along a length of the extended body 105 and/or the lattice structure 121, 321, 721, 821, 921 cores in the CAD model.

The large format 3D printer, in some embodiments, may be operated to 3D print parts of the shafts 101, 301, 401, 501, 701, 801, 901 together, in a "single path". Where unlike materials are printed to together (e.g., a first material embedded within another, a first material abutting another, or a seamless transition from the first material to the second material), the large-format 3D printer can operate to change between filaments to 3D print the first and second (and any additional) materials together.

In some embodiments, the extended body 105 and the lattice structures 121, 321, 721, 821, 921 (shown in FIGS. 1, 22, 28, 30, and 34 respectively) are 3D printed separately from one another. One or more of the lattice structures 121, 321, 721, 821, 921 may then be joined (e.g., welded, bonded, adhered, etc.) with the extended body 105.

With reference to FIG. 35, a first example golf club 1010 includes the first example golf club shaft 101, an example golf club head 1012, and an example grip 1014. The golf club head 1012 is connected to the first example golf club shaft 101 at the tip end 114. The grip 1014 is connected to the first example golf club shaft 101 at the butt end 115. In some embodiments, the golf club head 1012 is 3D printed in conjunction, and thus integral, with the first example golf club shaft 101. In some embodiments, the grip 1014 is 3D printed in conjunction, and thus integral, with the first example golf club shaft 101.

With reference to FIG. 36, a second example golf club 1020 includes the second example golf club shaft 301, the example golf club head 1012, and the example grip 1014. The golf club head 1012 is connected to the second example golf club shaft 301 at the tip end 114. The grip 1014 is connected to the second example golf club shaft 301 at the butt end 115. In some embodiments, the golf club head 1012 is 3D printed in conjunction, and thus integral, with the second example golf club shaft 301. In some embodiments, the grip 1014 is 3D printed in conjunction, and thus integral, with the second example golf club shaft 301.

With reference to FIG. 37, a third example golf club 1030 includes the third example golf club shaft 401, the example golf club head 1012, and the example grip 1014. The golf club head 1012 is connected to the third example golf club shaft 401 at the tip end 114. The grip 1014 is connected to the third example golf club shaft 401 at the butt end 115. In some embodiments, the golf club head 1012 is 3D printed in conjunction, and thus integral, with the third example golf club shaft 401. In some embodiments, the grip 1014 is 3D printed in conjunction, and thus integral, with the third example golf club shaft 401.

With reference to FIG. 38, a fourth example golf club 1040 includes the fourth example golf club shaft 501, the example golf club head 1012, and the example grip 1014. The golf club head 1012 is connected to the fourth example golf club shaft 501 at the tip end 114. The grip 1014 is connected to the fourth example golf club shaft 501 at the butt end 115. In some embodiments, the golf club head 1012 is 3D printed in conjunction, and thus integral, with the fourth example golf club shaft 501. In some embodiments, the grip 1014 is 3D printed in conjunction, and thus integral, with the fourth example golf club shaft 501.

With reference to FIG. 39, a fifth example golf club 1050 includes the fifth example golf club shaft 701, the example golf club head 1012, and the example grip 1014. The golf club head 1012 is connected to the fifth example golf club shaft 701 at the tip end 114. The grip 1014 is connected to the fifth example golf club shaft 701 at the butt end 115. In some embodiments, the golf club head 1012 is 3D printed in conjunction, and thus integral, with the fifth example golf club shaft 701. In some embodiments, the grip 1014 is 3D printed in conjunction, and thus integral, with the fifth example golf club shaft 701.

With reference to FIG. 40, a sixth example golf club 1060 includes the sixth example golf club shaft 801, the example golf club head 1012, and the example grip 1014. The golf club head 1012 is connected to the sixth example golf club shaft 801 at the tip end 114. The grip 1014 is connected to the sixth example golf club shaft 801 at the butt end 115. In some embodiments, the golf club head 1012 is 3D printed in conjunction, and thus integral, with the sixth example golf club shaft 801. In some embodiments, the grip 1014 is 3D printed in conjunction, and thus integral, with the sixth example golf club shaft 801.

With reference to FIG. 41, a seventh example golf club 1070 includes the seventh example golf club shaft 901, the example golf club head 1012, and the example grip 1014. The golf club head 1012 is connected to the seventh example golf club shaft 901 at the tip end 114. The grip 1014 is connected to the seventh example golf club shaft 901 at the butt end 115. In some embodiments, the golf club head 1012 is 3D printed in conjunction, and thus integral, with the seventh example golf club shaft 901. In some embodiments, the grip 1014 is 3D printed in conjunction, and thus integral, with the seventh example golf club shaft 901.

The disclosure provides golf club shafts and methods of making them that involve 3D printing. Embodiments include methods of making golf club shafts that include a lattice structure, and golf club shafts that are least partially 3D printed. Methods herein include designing a shaft in a computer-assisted drawing (CAD) program, e.g., with a lattice structure at any point therein. Parameters like dimensions and material for an outer layer or dimensions, locations, material, and pore structure for a lattice structure inside of the outer layer can be adjusted in the CAD model. The designed shaft may be created using a large-format 3D printer. Where unlike materials are printed together (e.g., a first material embedded within another, a first material abutting another, a seamless transition from the first material to the second material, etc.), the large-format 3D printer can operate to change input material to form the materials together.

What is claimed is:

1. A golf club shaft, comprising:
an extended body that includes an outer layer and a core, wherein at least a portion of the core is a hollow tubular structure, the extended body extending between a butt end and a tip end and defining a longitudinal axis that extends centrally through the butt end and the tip end, wherein the outer layer and the core comprise at least two unlike materials printed together, wherein the extended body is unitary, wherein the extended body has a round cross section that gradually tapers in diameter between the tip end and the butt end, wherein an outer passage is formed between the core and an inner surface of the outer layer, and wherein the core defines an inner central passage that is intersected by the longitudinal axis and is in communication with the outer passage via a plurality of radial passages formed through the core.

2. The golf club shaft of claim 1, wherein the at least two unlike materials are sintered together.

3. The golf club shaft of claim 2, wherein the at least two unlike materials includes at least one of a nylon, acrylonitrile butadiene styrene, or carbon fiber material.

4. The golf club shaft of claim 3, wherein the outer layer has a substantially tubular shape.

5. The golf club shaft of claim 4, wherein the extended body defines a longitudinal axis that intersects the butt end and the tip end, the outer layer being coaxial with the longitudinal axis.

6. The golf club shaft of claim 1, wherein the outer layer is coextensive with the butt end and the tip end of the extended body.

7. The golf club shaft of claim 1, wherein the outer layer comprises a perimeter of carbon fiber and the extended body further includes a plurality of ribs disposed inside the outer layer, wherein the plurality of ribs are formed of at least one of a nylon, acrylonitrile butadiene styrene, or carbon fiber material.

8. A golf club shaft, comprising:
a butt end;
a tip end;
an extended body that includes an outer layer and defines a length along a longitudinal axis that extends centrally through the tip end and the butt end; and
a core disposed within and along a portion of the extended body, wherein at least a portion of the core is a hollow tubular structure, wherein the length of the extended body includes a first section and a second section that are coaxial with one another relative to the longitudinal axis, wherein the first section comprises a first material that is different from a second material of the second section, wherein the first and second materials are printed together, such that the extended body is unitary, wherein the first section extends from the butt end of the shaft to the second section, and
wherein the core defines an inner central passage intersected by the longitudinal axis, the inner central passage being in communication with a plurality of radial passages formed through the core.

9. The golf club shaft of claim 8, wherein at least one of the first material and the second material is a metal material.

10. The golf club shaft of claim 8, wherein the first section has a first stiffness that is different from a second stiffness of the second section.

11. The golf club shaft of claim 10, wherein the first section includes a plurality of ribs that at least partially fills an interior cavity of the first section.

12. The golf club shaft of claim 8, wherein the first material is carbon fiber and the second material is at least one of a nylon or acrylonitrile butadiene styrene material.

13. A golf club shaft, comprising:
an extended body defining a longitudinal axis that extends centrally through a tip end and a butt end of the golf club shaft, and through which a plane extends, the plane defining a first side of the extended body and a second side of the extended body;
an outer layer disposed about the longitudinal axis of the extended body; and
a rib disposed along a length of the extended body and extending inwardly from the outer layer to an inner ring, wherein a first side of the rib is disposed proximate to the outer layer and at least partially defines an outer passage with the outer layer, wherein a second side of the rib is disposed distal to the outer layer, wherein the rib and the inner ring define an inner passage that is intersected by the longitudinal axis, the inner passage being in communication with the outer passage via a radial passage formed through the core, wherein the golf club shaft includes a first material of the outer layer and a second material of the core that is different from the first material, wherein the first material of the outer layer and the second material of the core are printed together as a unitary structure.

14. The golf club shaft of claim 13, wherein at least one of the first material or the second material is a metal material.

15. The golf club shaft of claim 13, wherein at least one of the first material or the second material is a non-metal material.

16. The golf club shaft of claim 15, wherein a length of the extended body includes a first section and a second section, and the rib is disposed in the first section.

17. The golf club shaft of claim 16, wherein the rib is disposed in an outer wall of the extended body.

18. The golf club shaft of claim 17, wherein the golf club shaft has a round cross section and tapers in diameter between the tip end and the butt end.

* * * * *